(12) United States Patent
Yokoyama

(10) Patent No.: US 11,362,890 B2
(45) Date of Patent: Jun. 14, 2022

(54) SYSTEM MANAGEMENT DEVICE, SYSTEM MANAGEMENT METHOD, PROGRAM, AND INFORMATION PROCESSING SYSTEM

(71) Applicant: NEC Corporation, Tokyo (JP)

(72) Inventor: Jun Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 15/897,256

(22) Filed: Feb. 15, 2018

(65) Prior Publication Data
US 2018/0262395 A1 Sep. 13, 2018

(30) Foreign Application Priority Data

Mar. 8, 2017 (JP) .............................. JP2017-043518

(51) Int. Cl.
*H04L 41/0813* (2022.01)
*H04L 41/0869* (2022.01)
(Continued)

(52) U.S. Cl.
CPC ...... *H04L 41/0813* (2013.01); *H04L 41/0836* (2013.01); *H04L 41/0869* (2013.01); *H04L 41/5019* (2013.01)

(58) Field of Classification Search
CPC . H04L 67/1008; H04L 67/101; H04L 45/306; H04L 67/1002; H04L 67/1014; H04L 47/70; H04L 47/78; H04L 47/783; H04L 65/80; H04L 5/0055; H04L 45/24; H04L 45/125; H04L 41/0896; H04L 41/142; H04L 41/5019; H04L 41/0836; H04L 41/5003; H04L 41/5016; H04L 41/5025; H04L 43/0805; H04L 43/0876; H04L 43/0882; H04L 45/22; H04L 45/302; H04L 67/1012; H04L 47/822; H04L 41/0816; H04L 41/5029; H04L 47/125; H04L 47/2425; H04L 47/805;
(Continued)

(56) References Cited

U.S. PATENT DOCUMENTS 6,665,701 B1 * 12/2003 Combs .................. G06F 9/5011
709/200
8,396,807 B1 * 3/2013 Yemini ............... H04L 67/1023
705/77
(Continued)

FOREIGN PATENT DOCUMENTS

JP 2001-147906 A 5/2001
JP 2003-163687 A 6/2003
(Continued)

OTHER PUBLICATIONS

Japanese Office Action for JP Application No. 2017-043518 dated Feb. 6, 2018 with English Translation.

*Primary Examiner* — Kamal B Divecha
*Assistant Examiner* — Alex H. Tran

(57) ABSTRACT

A system management device includes a storage part for storing at least one of a device configuration of a device and a network configuration of a network to which the device belongs. The device includes a control part configured to, from among devices belonging to a system, determine the device for executing a process on a basis of at least one of the device configuration and the network configuration.

7 Claims, 13 Drawing Sheets

(51) Int. Cl.
*H04L 41/0823* (2022.01)
*H04L 41/5019* (2022.01)

(58) Field of Classification Search
CPC ............... H04L 63/205; H04L 67/1031; G06F 2009/4557; G06F 9/45558; G06F 11/3466; G06F 9/45533; G06F 9/5005; G06F 11/1484; G06F 11/3447; G06F 11/3452; G06F 11/3476; G06F 1/329; H04W 52/0248; H04W 72/0486; H04W 72/0493
See application file for complete search history.

(56) References Cited

U.S. PATENT DOCUMENTS

| | | | |
|---|---|---|---|
| 9,501,326 B2* | 11/2016 | Nemoto | G06F 11/3419 |
| 9,565,689 B2* | 2/2017 | Kandhalu Raghu | H04W 24/02 |
| 2007/0124342 A1* | 5/2007 | Yamamoto | G06F 9/466 |
| 2007/0245352 A1* | 10/2007 | Ma | H04L 67/1008 |
| | | | 718/105 |
| 2008/0019564 A1* | 1/2008 | Murata | G01C 21/20 |
| | | | 342/357.31 |
| 2008/0195755 A1* | 8/2008 | Lu | H04L 67/1002 |
| | | | 709/241 |
| 2008/0260116 A1* | 10/2008 | Didcock | H04M 3/241 |
| | | | 379/88.18 |
| 2009/0119664 A1* | 5/2009 | Pike | G06F 9/45558 |
| | | | 718/1 |
| 2009/0172168 A1* | 7/2009 | Sonoda | H04L 67/1002 |
| | | | 709/226 |
| 2011/0029675 A1* | 2/2011 | Yeow | G06F 11/2041 |
| | | | 709/226 |
| 2012/0191681 A1 | 7/2012 | Yamamoto et al. | |
| 2012/0254966 A1* | 10/2012 | Parker | G06F 9/5027 |
| | | | 726/7 |
| 2012/0307650 A1* | 12/2012 | Kameda | G06F 11/0751 |
| | | | 370/242 |
| 2013/0097304 A1 | 4/2013 | Asthana et al. | |
| 2014/0019613 A1* | 1/2014 | Ishikawa | G06F 11/1484 |
| | | | 709/224 |
| 2014/0109184 A1* | 4/2014 | Parker, II | H04L 49/252 |
| | | | 726/3 |
| 2014/0259014 A1* | 9/2014 | Watanabe | G06F 9/5077 |
| | | | 718/1 |
| 2015/0143169 A1* | 5/2015 | Konta | G06F 3/0683 |
| | | | 714/6.32 |
| 2015/0149175 A1* | 5/2015 | Hirata | G10L 15/30 |
| | | | 704/246 |
| 2016/0011909 A1* | 1/2016 | Nemoto | G06F 11/3419 |
| | | | 718/104 |
| 2016/0179581 A1* | 6/2016 | Soundararajan | G06F 9/5033 |
| | | | 718/104 |
| 2016/0182298 A1* | 6/2016 | Brooks | H04L 51/24 |
| | | | 709/206 |
| 2016/0323161 A1* | 11/2016 | Cuervo Laffaye | G06F 9/5044 |
| 2017/0093663 A1* | 3/2017 | Douglas | H04L 41/12 |
| 2017/0111445 A1* | 4/2017 | Kunde | H04L 67/10 |
| 2017/0155709 A1* | 6/2017 | Badanahatti | G06F 3/0659 |
| 2017/0220383 A1* | 8/2017 | Raj | G06F 9/505 |
| 2017/0264486 A1* | 9/2017 | Angell | H04L 43/16 |
| 2018/0084039 A1* | 3/2018 | Wang | H04L 67/32 |
| 2018/0159745 A1* | 6/2018 | Byers | H04L 43/08 |
| 2018/0191818 A1* | 7/2018 | Maddali | H04L 47/125 |
| 2018/0331885 A1* | 11/2018 | Raymond | H04L 41/044 |
| 2019/0004837 A1* | 1/2019 | Tiwary | H04L 67/10 |

FOREIGN PATENT DOCUMENTS

| | | |
|---|---|---|
| JP | 2004-282266 A | 10/2004 |
| JP | 2006031096 A | 2/2006 |
| JP | 2007-226587 A | 9/2007 |
| JP | 2008-003907 A | 1/2008 |
| JP | 2011-141782 A | 7/2011 |
| JP | 2013-106193 A | 5/2013 |
| JP | 2014-135075 A | 7/2014 |
| JP | 2014-532246 A | 12/2014 |
| WO | 2007/063944 A1 | 6/2007 |

\* cited by examiner

Fig.9
RELATED PROCESSES
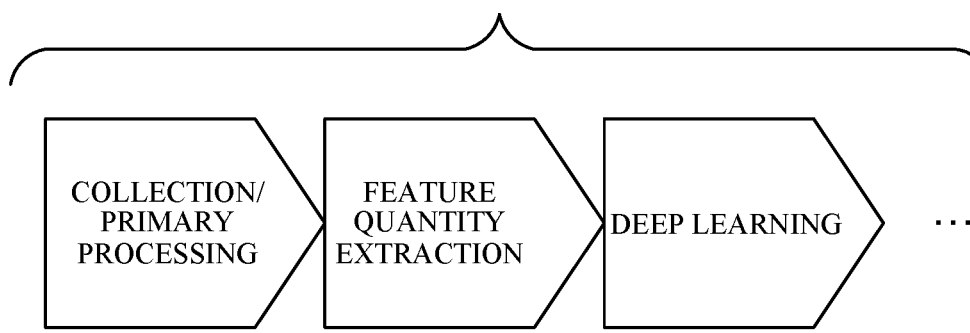
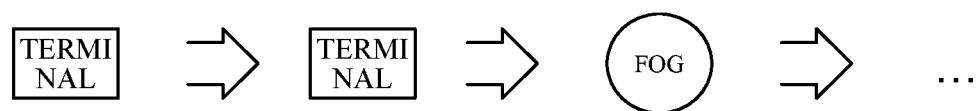

SYSTEM MANAGEMENT DEVICE, SYSTEM MANAGEMENT METHOD, PROGRAM, AND INFORMATION PROCESSING SYSTEM

INCORPORATION BY REFERENCE

This application is based upon and claims the benefit of priority from Japanese patent application No. 2017-043518, filed on Mar. 8, 2017, the disclosure of which is incorporated herein in its entirety by reference.

TECHNICAL FIELD

The present invention relates to a system management device, a system management method, a program, and an information processing system. More specifically, the present invention relates to a system management device which requests a device included by a system to execute a process according to a request from a user, a system management method, a program, and an information processing system.

BACKGROUND ART

Cloud computing, which executes various processes in accordance with requests from users connected via a network such as the Internet, is known.

A technique related to the technology as described above is disclosed by, for example, Patent Document 1. Patent Document 1 discloses a device including a processor and a memory, configured to receive a dynamic reliability profile specifying a reliability parameter of a client and determine a cloud resource configuration of the client on the basis of the dynamic reliability profile of the client.

Further, a related technique is disclosed by, for example, Patent Document 2. Patent Document 2 discloses a system which includes a storage unit keeping output data outputted by each task for processing a job and a setting unit setting an importance degree for each task. According to Patent Document 2, a task stores output data outputted after execution of a process into the storage unit by a storage method meeting the importance degree set for the task. Consequently, it is possible to consider a data importance degree or the like for each task characteristic, so that it is possible to properly store data while reducing cost.

Further, a related technique is disclosed by, for example, Patent Document 3. Patent Document 3 discloses a control method which includes: collecting information indicating a current operation status from each processing computer in accordance with an allocation strategy; selecting a group of processing computers in accordance with the allocation strategy from among successfully collected computers; allocating at least one processing computer for each processing unit from among the selected group of processing computers; and transmitting the processing unit to the allocated process computer. According to Patent Document 3, the abovementioned configuration allows effective use of resources of a plurality of computers connected to a network.

Further, related techniques are disclosed by, for example, Patent Documents 4 and 5. Patent Documents 4 and 5 each disclose a technique to, when a communication environment or quality gets worse, perform communication via another path.

Patent Document 1: Japanese Unexamined Patent Application Publication (Translation of PCT Application) No. JP-A 2014-532246

Patent Document 2: Japanese Unexamined Patent Application Publication No. JP-A 2013-106193

Patent Document 3: Japanese Unexamined Patent Application Publication No. JP-A 2008-003907

Patent Document 4: Japanese Unexamined Patent Application Publication No. JP-A 2004-282266

Patent Document 5: Japanese Unexamined Patent Application Publication No. JP-A 2003-163687

Currently, a variety of information processing devices are connected to a network; for example, a corporate data center, a fog server and an edge server in an on-premises environment, and a mobile phone terminal and a tablet owned by an individual. Such a variety of information processing devices can be used as resources used for executing processes according to requests from users.

On the other hand, such a variety of information processing devices as described above are quite different from each other in device configuration such as CPU performance and memory capacity, network configuration, and so on. Therefore, in order to use the information processing devices as described above as resources used in execution of a necessary process, it is desired to select a device to be requested to execute the process in consideration of the configuration of each of the information processing devices, a situation where it is placed, and so on.

However, in the case of the technique disclosed by Patent Document 1, the cloud resource configuration of a client is determined on the basis of the dynamic reliability profile of the client, whereas the configuration of a device to be requested to execute a process is not considered. Therefore, according to the technique disclosed by Patent Document 1, it is difficult to select a proper device as a device for executing a process from among a variety of information processing devices.

Such a problem also arises in the case of the technique disclosed by Patent Document 2, which focuses on an importance degree for each task. Moreover, Patent Document 3 describes collecting information indicating a current operation status, but does not describe considering a device configuration or a network configuration. Therefore, according to the technique disclosed by Patent Document 3, it is also difficult to request a proper device to execute a process by a proper method.

Further, the technique disclosed by Patent Documents 4 and 5 is performing communication via another path when a communication environment or quality gets worse. Therefore, it is difficult to take necessary steps before a communication environment or quality gets worse and, as in the case of Patent Documents 1 to 3, it is difficult to solve the problem that it is difficult to select a proper device from among a variety of information processing devices.

Thus, there has been a problem that it is difficult to properly use an available resource in execution of a process in accordance with a resource condition and so on.

SUMMARY OF THE INVENTION

Accordingly, an object of the present invention is to provide a system management device which solves the problem that it is difficult to properly use an available resource in execution of a process in accordance with a resource condition and so on, a system management method, a program, and an information processing system.

In order to achieve the object, a system management device as an aspect of the present invention includes:

a storage part for storing at least one of a device configuration of a device and a network configuration of a network to which the device belongs; and a control part configured to, from among a plurality of devices belonging to a system, determine the device for executing a process on a basis of at least one of the device configuration and the network configuration.

Further, a system management method as another aspect of the present invention is a system management method executed by a system management device.

The method includes:

acquiring at least one of a device configuration of a device and a network configuration of a network to which the device belongs; and from among a plurality of devices belonging to a system, determining the device for executing a process on a basis of at least one of the acquired device configuration and the acquired network configuration.

Further, a non-transitory computer-readable medium storing a computer program as another aspect of the present invention is a non-transitory computer-readable medium storing a computer program comprising instructions for causing an information processing device to realize a control unit. The information processing device includes a storage part configured to store at least one of a device configuration of a device and a network configuration of a network to which the device belongs. The control unit is configured to, from among a plurality of devices belonging to a system, determine the device for executing a process on a basis of at least one of the acquired device configuration and the acquired network configuration.

Further, an information processing system as another aspect of the present invention includes:

a system management device including: a storage part for storing at least one of a device configuration of a device and a network configuration of a network to which the device belongs; and a control part configured to, from among a plurality of devices belonging to a system, determine the device for executing a process on a basis of at least one of the device configuration and the network configuration; and the device configured to execute the process on a basis of an instruction from the system management device.

Further, a system management device as another aspect of the present invention includes:

a status information acquisition part configured to acquire at least one of device status information indicating a status of a device and network status information indicating a status of a network to which the device belongs; and a control unit configured to, on a basis of at least one of the device status information and the network status information, determine whether or not to cause a plurality of devices to execute the same process.

With the configurations as described above, the present invention can provide a system management device which solves the problem that it is difficult to properly use an available resource in execution of a process in accordance with a resource condition and so on, a system management method, a program, and an information processing system.

BRIEF DESCRIPTION OF DRAWINGS

FIG. 9 is a diagram showing an example of related processes;

EXEMPLARY EMBODIMENT

First Exemplary Embodiment

Figure 1:
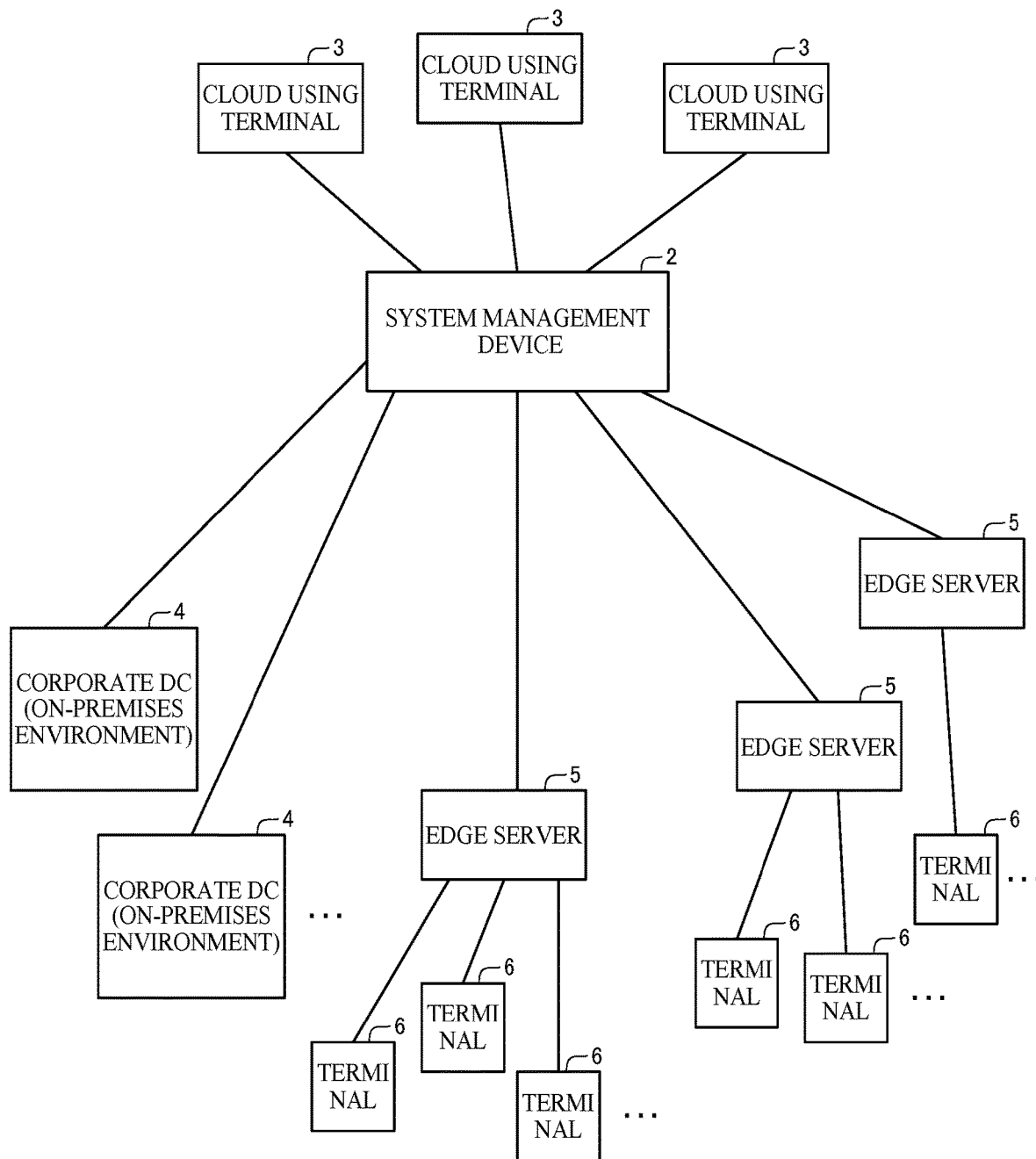
FIG. 1 is a diagram showing an example of a configuration of a whole information processing system according to a first exemplary embodiment of the present invention.
Figure 2:
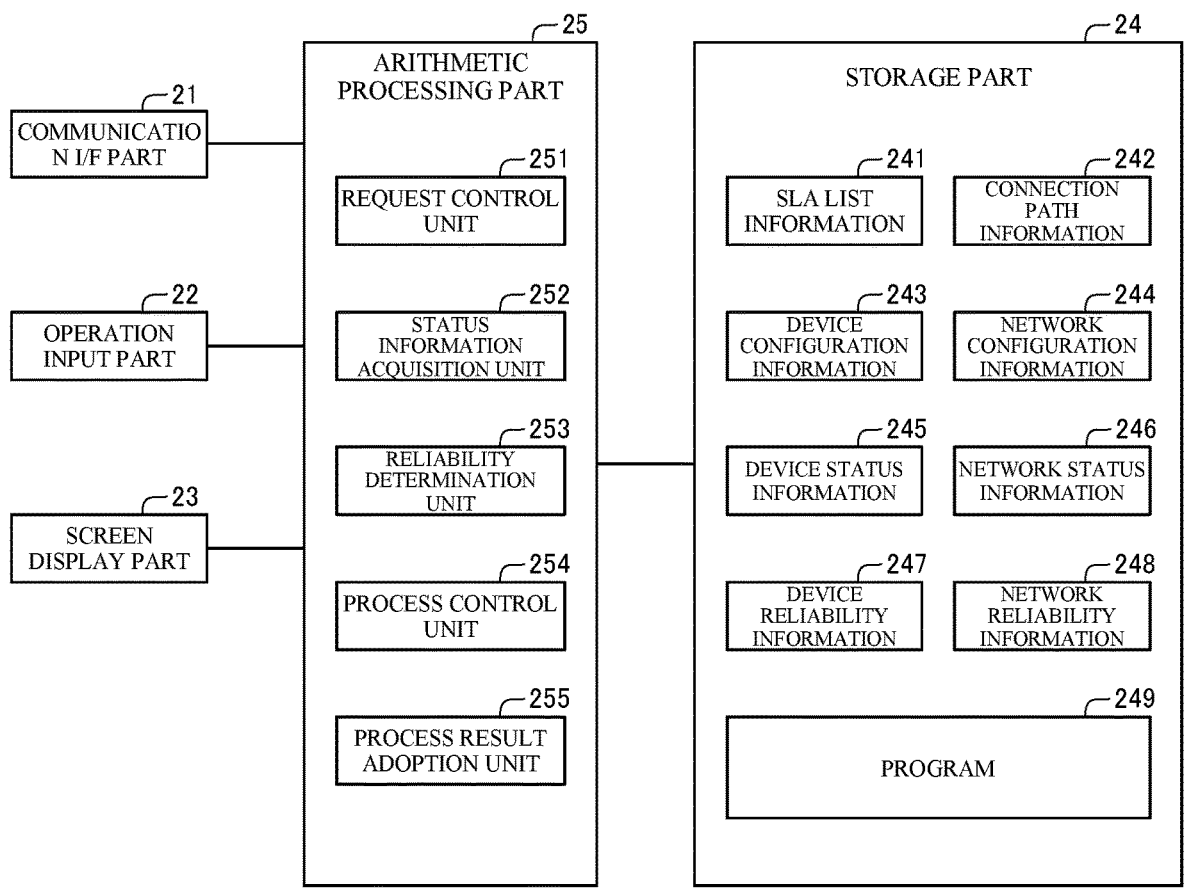
FIG. 2 is a diagram showing an example of a configuration of a system management device shown in FIG. 1.
Figure 3:
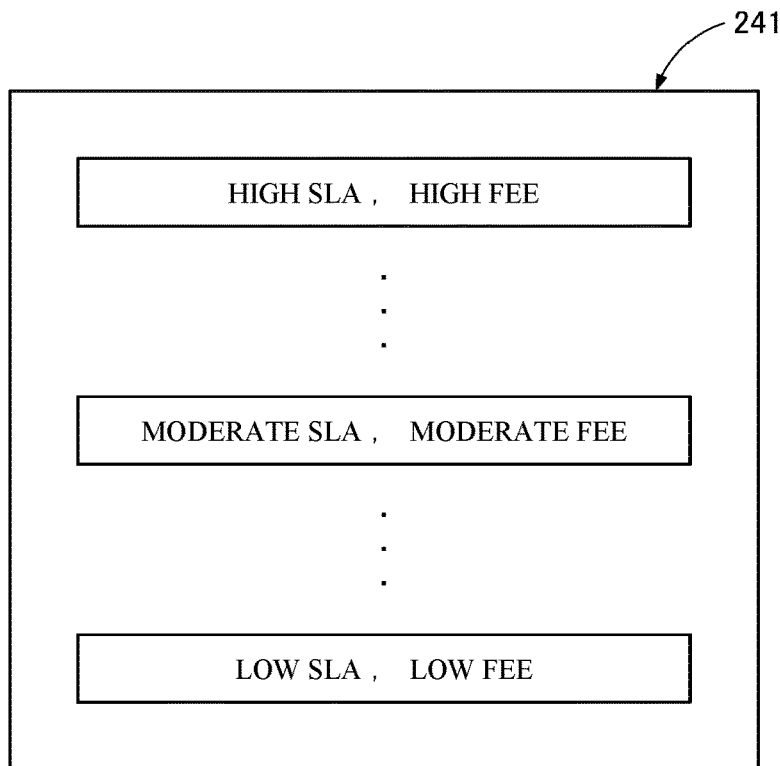
FIG. 3 is a diagram showing an example of SLA list information shown in FIG. 2.
Figure 4:
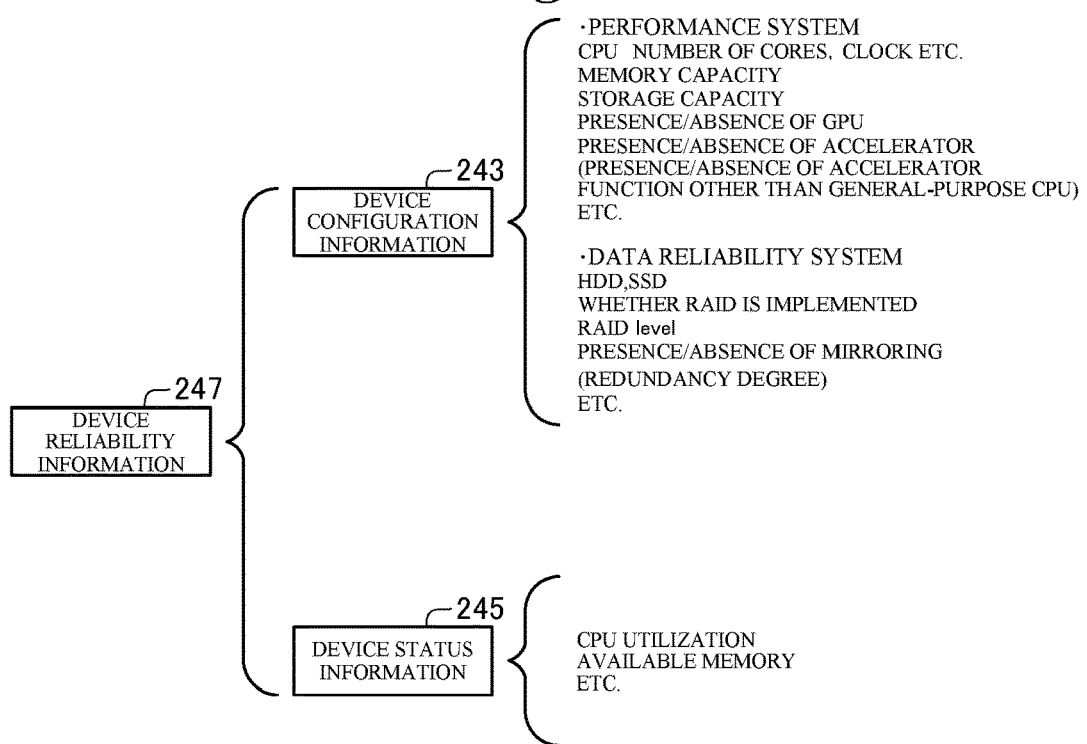
FIG. 4 is a diagram for describing device configuration information, device status information and device reliability information shown in FIG. 2.
Figure 5:
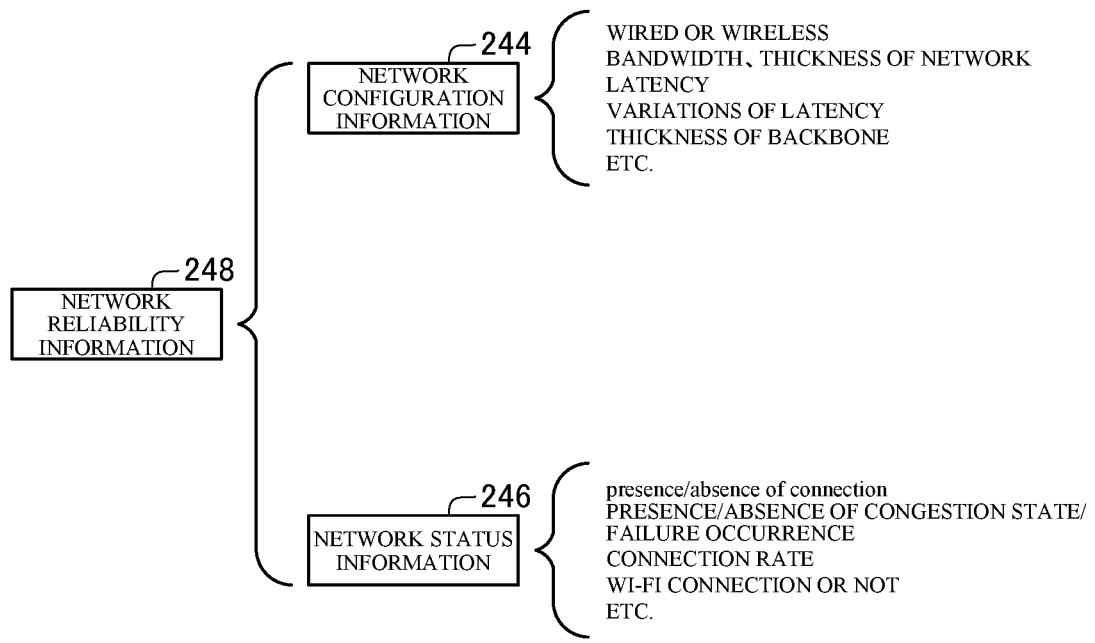
FIG. 5 is a diagram for describing network configuration information, network status information and network reliability information shown in FIG. 2.
Figure 6:
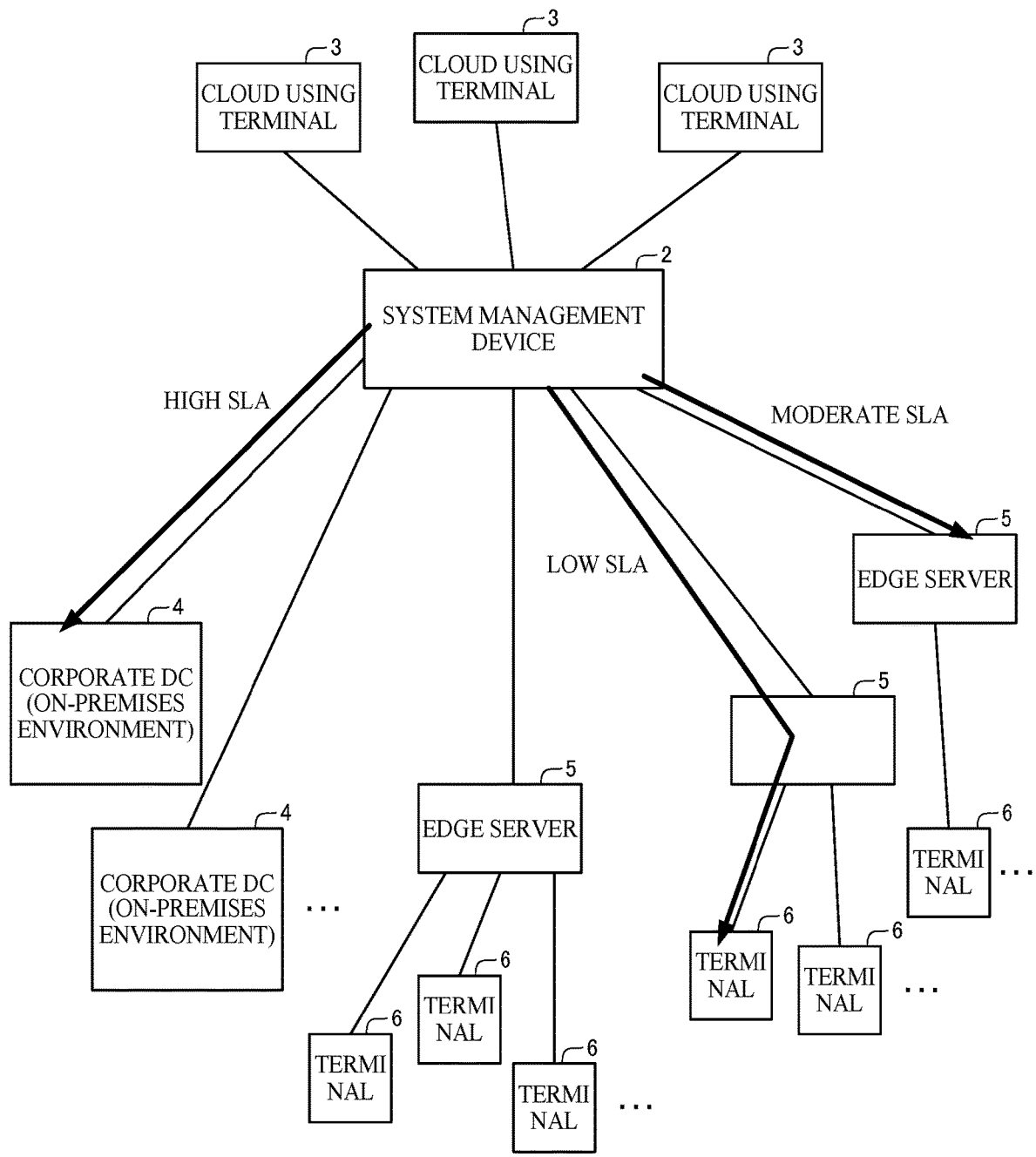
FIG. 6 is a diagram showing an example of a device determined on the basis of an SLA included by a request and reliability information.
Figure 7:
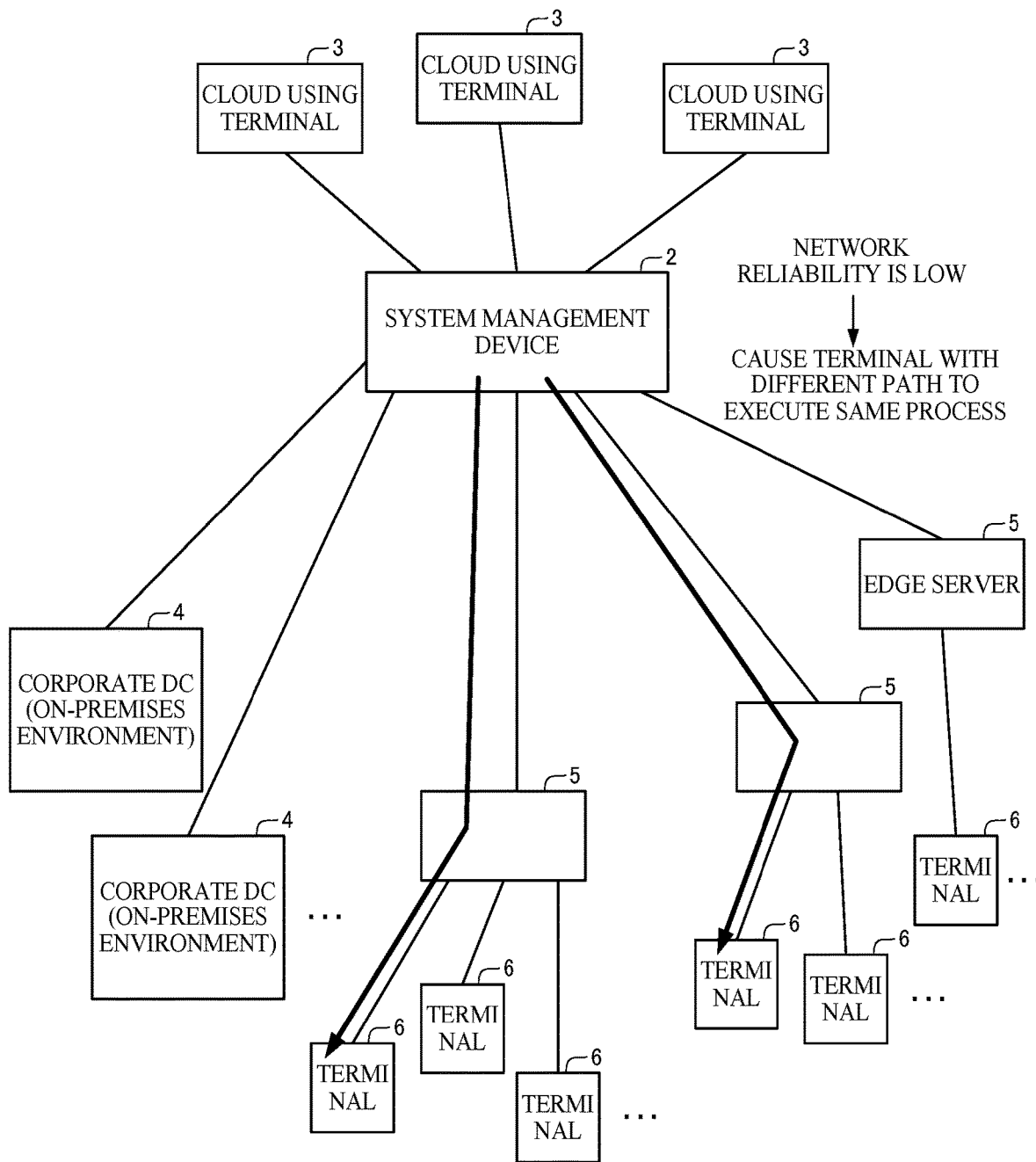
FIG. 7 is a diagram showing an example of a case of causing a device with low network reliability to execute a process.
Figure 8:
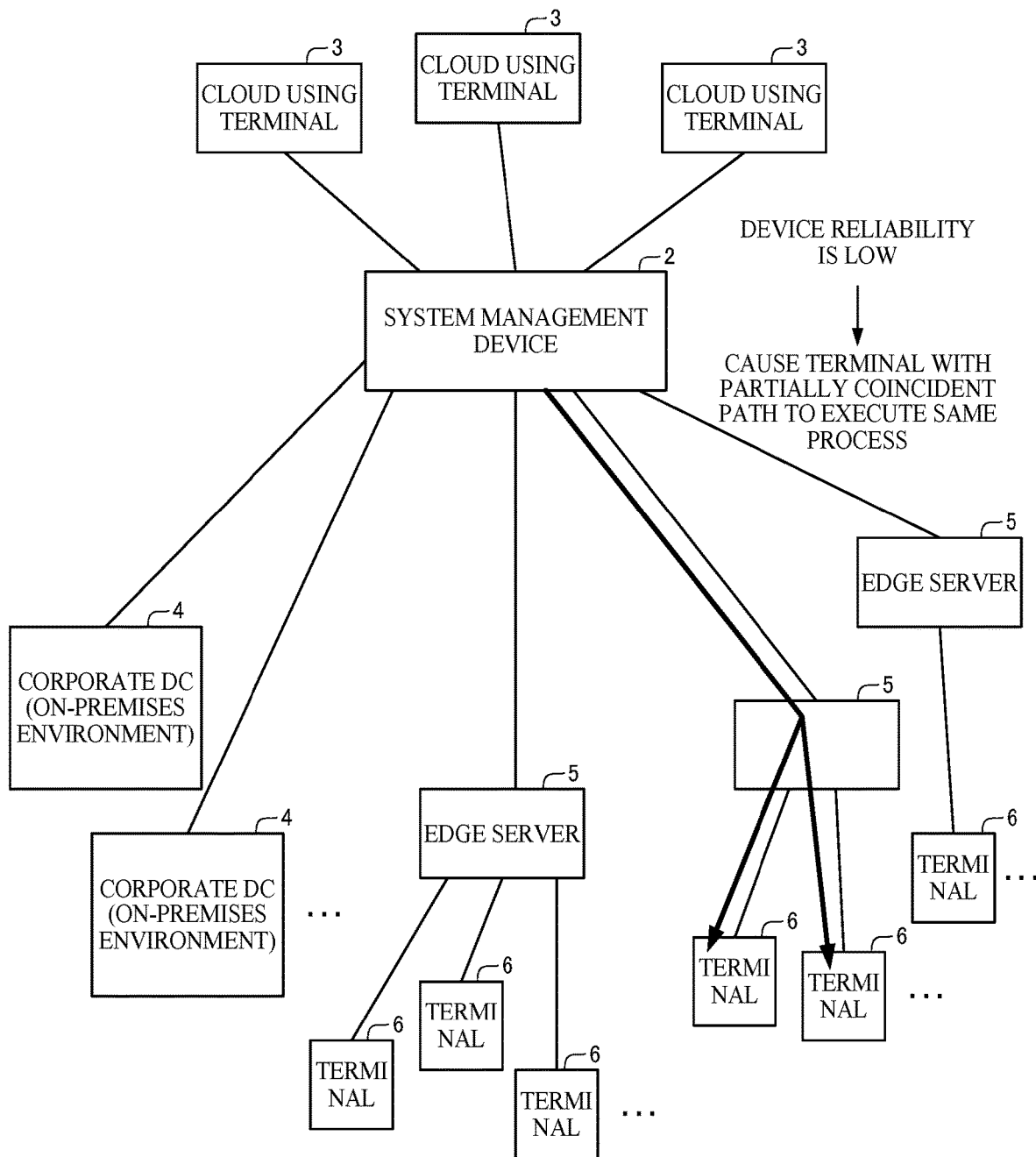
FIG. 8 is a diagram showing an example of a case of causing a device with low device reliability to execute a process.
Figure 10:
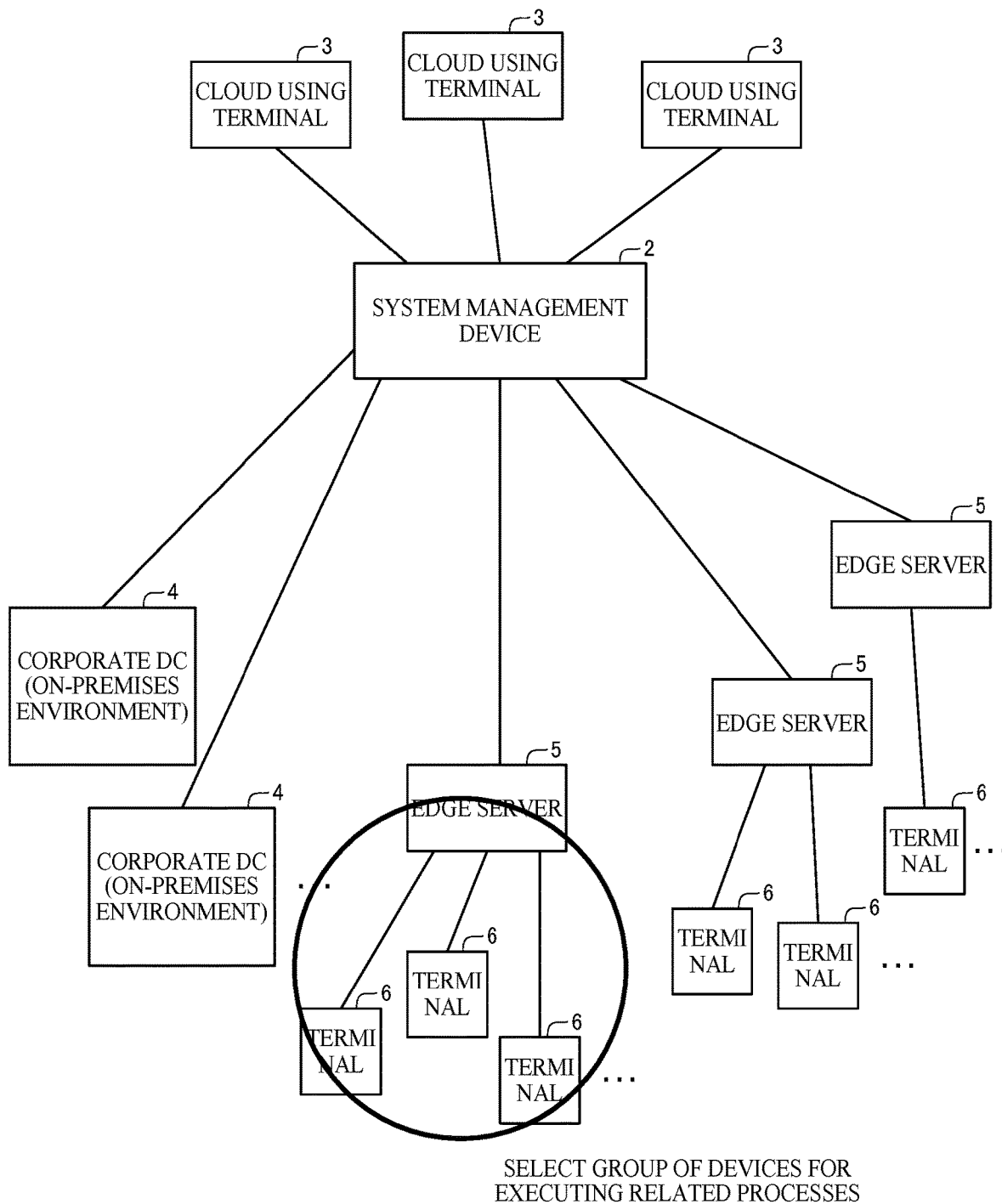
FIG. 10 is a diagram showing an example of a case of selecting a group of devices for executing related processes.
Figure 11:
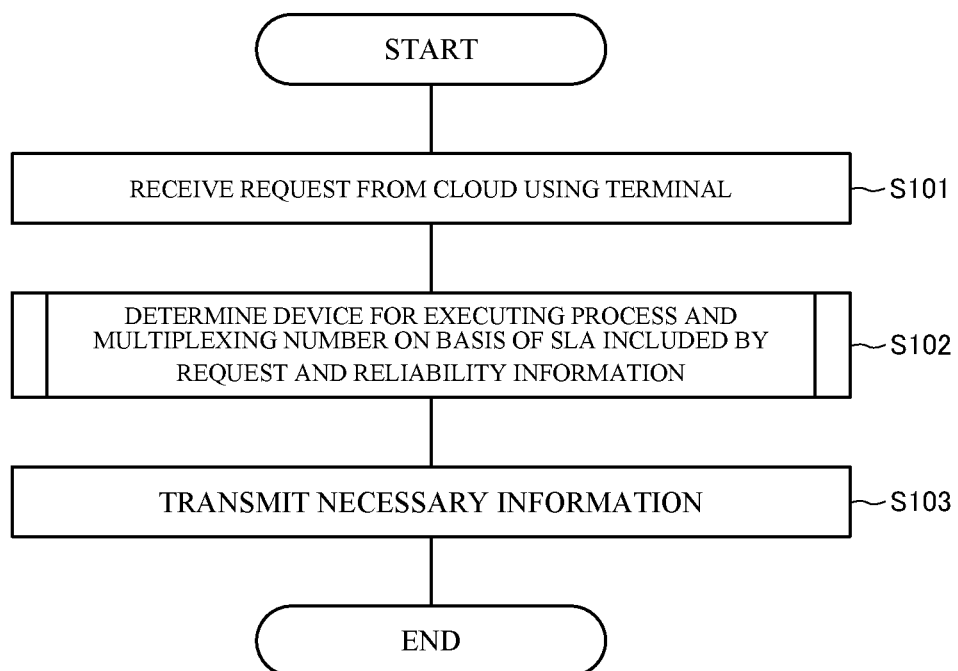
FIG. 11 is a flowchart showing an example of an overall flow of requesting to execute a process by the system management device.
Figure 12:
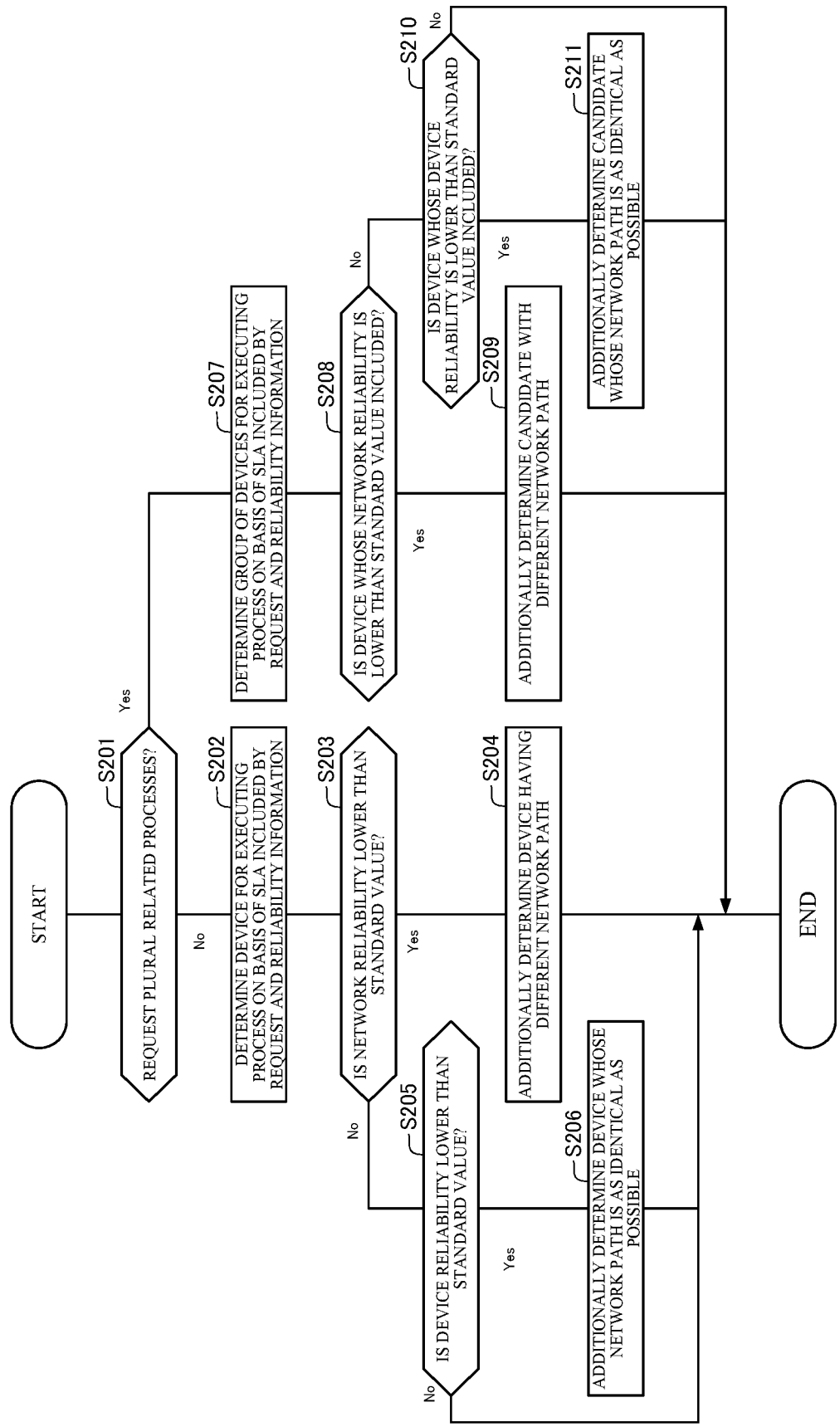
FIG. 12 is a flowchart showing an example of the details of a process at step S102 shown in FIG. 11.
Figure 13:
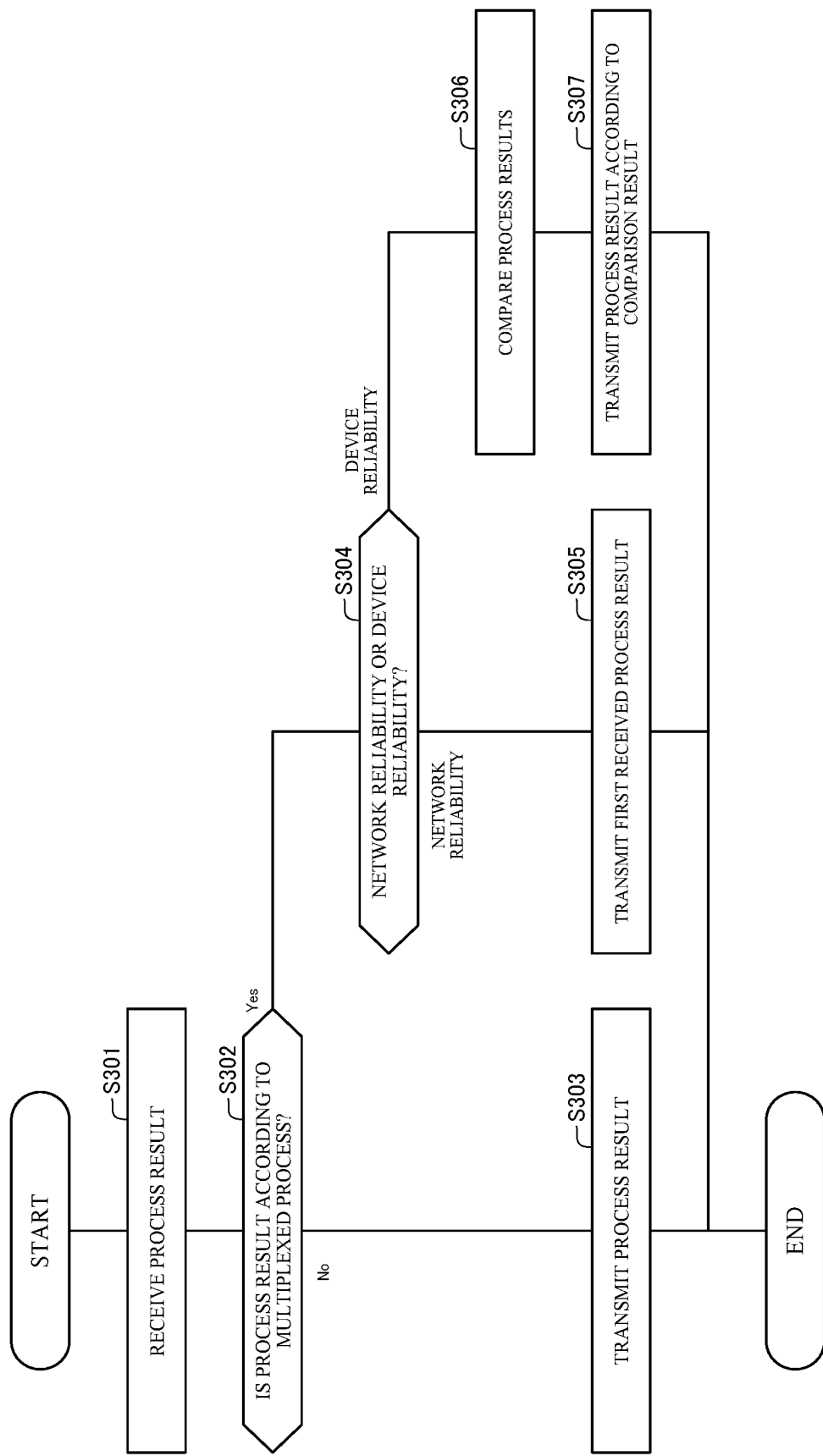
FIG. 13 is a flowchart showing an example of a process executed when the system management device returns a process result.

A first exemplary embodiment of the present invention will be described with reference to FIGS. 1 to 13. FIG. 1 is a diagram showing an example of a configuration of a whole information processing system 1. FIG. 2 is a diagram showing an example of a configuration of a system management device 2. FIG. 3 is a diagram showing an example of SLA list information 241. FIG. 4 is a diagram for describing device configuration information 243, device status information 245, and device reliability information 247. FIG. 5 is a diagram for describing network configuration information 244, network status information 246, and network reliability information 248. FIG. 6 is a diagram showing an example of a device determined on the basis of an SLA included by a request and reliability information. FIG. 7 is a diagram showing an example of a case of causing a device with low network reliability to execute a process. FIG. 8 is a diagram showing an example of a case of causing a device with low device reliability to execute a process. FIG. 9 is a diagram showing an example of related processes. FIG. 10 is a diagram showing an example of a case of selecting a group of devices for executing related processes. FIG. 11 is a flowchart showing an example of an overall flow of requesting to execute a process by the system management device 2. FIG. 12 is a flowchart showing an example of the details of a process at step S102 shown in FIG. 11. FIG. 13 is a flowchart showing an example of a process executed when the system management device 2 returns a process result.

In the first exemplary embodiment, the information processing system 1 will be described. The information processing system 1 includes the system management device 2 that executes a process according to a request from a cloud using terminal 3 with the use of excess IT (information technology) resources of previously contracted service users. As will be described later, resources used by the system management device 2 in this exemplary embodiment include devices with low device reliability and network reliability, such as tablets and smartphones owned by individuals. The system management device 2 in this exemplary embodiment determines a device for executing a process on the basis of an SLA (Service Level Agreement) included by a request and reliability information of each of the resources. Moreover, for example, in the case of causing a device with low device reliability and network reliability to execute a process, the system management device 2 causes a plurality of devices to execute the same process. By thus determining a device for executing a process on the basis of an SLA included by a request and reliability information of each resource and making the process multiplex as needed, it is possible to use a variety of excess IT resources while maintaining the reliability of the process.

FIG. 1 shows an example of a configuration of the whole information processing system 1 in this exemplary embodiment. With reference to FIG. 1, the information processing system 1 in this exemplary embodiment includes the system management device 2, the cloud using terminal 3, a corporate DC (data center) 4, an edge server 5, and a terminal 6.

As shown in FIG. 1, the system management device 2 and the cloud using terminal 3 are connected so as to be able to communicate to each other via a relay device, a network and so on which are not shown in the drawings. Moreover, the system management device 2 and the corporate DC 4 are connected, the system management device 2 and the edge server 5 are connected, and the system management device 2 and a terminal 6 are connected, respectively, so as to be able to communicate with each other via a relay device, a network and so on which are not shown in the drawings. The system management device 2 and the terminal 6 may be connected via the edge server 5, or may be connected directly not via the edge server 5. Likewise, the system management device 2 and the corporate DC 4 may be connected via the edge server 5, or may by connected directly not via the edge server 5.

The number of the cloud using terminals 3, the number of the corporate DCs 4, the number of the edge servers 5 and the number of the terminals 6 included by the information processing system 1 are not limited to the numbers shown in FIG. 1. The information processing system 1 can include any number of cloud using terminals 3, corporate DCs 4, edge servers 5, and terminals 6.

The system management device 2 receives a request from the cloud using terminal 3. Then, the system management device 2 executes a process according to the received request with the use of excess IT resources such as the corporate DC 4, the edge server 5 and the terminal 6. As will be described later, the system management device 2 determines a device for executing a process on the basis of an SLA included by a request and reliability information of each device such as the corporate DC 4, the edge server 5 and the terminal 6. Moreover, the system management device 2 causes a plurality of devices to execute a single process as needed, for example, in the case of causing a device with low network reliability or device reliability to execute the process.

With reference to FIG. 2, the system management device 2 includes, as major components, a communication I/F part 21, an operation input part 22, a screen display part 23, a storage part 24, and an arithmetic processing part 25.

The communication I/F part 21 is formed by a dedicated data communication circuit. The communication I/F part 21 performs data communication with the cloud using terminal 3, the corporate DC 4, the edge server 5, and the terminal 6 connected via a communication circuit.

The operation input part 22 is formed by an operation input device such as a keyboard and a mouse, and detects an operation by an operator operating the system management device 2 and outputs it to the arithmetic processing device 25.

The screen display part 23 is formed by a screen display device such as an LCD (Liquid Crystal Display). The screen display part 23 displays a variety of information in accordance with an instruction from the arithmetic part 25.

The storage part 24 is a storage device such as a hard disk and a memory. In the storage part 24, process information necessary for a variety of processes in the arithmetic processing part 25 and a program 249 are stored. The program 249 is a program which is loaded to and executed by the arithmetic processing part 25 and thereby realizes a variety of processing parts. The program 249 is previously loaded from an external device (not shown in the drawings) or a storage medium (not shown in the drawings) via a data input and output function such as the communication I/F part 21, and stored in the storage part 24. Major information stored in the storage part 24 is, for example, SLA list information 241, connection path information 242, device configuration information 243, network configuration information 244, device status information 245, network status information 246, device reliability information 247, and network reliability information 248.

The SLA list information 241 is information transmitted to the cloud using terminal 3 by a request control unit 251. The SLA list information 241 includes, for example, as shown in FIG. 3, a plurality of SLAs which can be selected by the cloud using terminal 3 (the number of SLAs may be any number). An SLA included by the SLA list information 241 is configured so that, for example, a fee for requesting the system management device 2 to execute a process gets higher as an SLA gets higher (i.e., as a service level agreed in SLA gets higher).

An SLA may not be selected by the cloud using terminal 3 for every transmission of a request (or for each process included in a request) but may be unique to each client (namely, each cloud using terminal 3) using the information processing system 1. In this case, for example, at the time of registration of a new cloud using terminal 3 as a service user, information associating the cloud using terminal 3 with an SLA is stored in the storage part 24. In other words, in the storage part 24, information associating information for identifying the cloud using terminal 3 with an SLA may be stored together with or instead of the SLA list information 241.

The connection path information 242 is information indicating connection paths on the network of the corporate DC 4, the edge sever 5, the terminal 6, and so on. The connection path information 242 includes information indicating connection paths between the system management device 2 and the corporate DC4, the edge server 5 and the terminal 6. The connection part information 242 may include information indicating connection paths between devices, for example, between the terminals 6, between the corporate DC 4 and the edge server 5, and the like.

The connection path information 242 is generated by, for example, at the time of newly registering the corporate DC 4, the edge server 5, the terminal 6 and the like as a service user, acquiring necessary information from the device, a relay device (not shown in the drawings) on the way of communication with the device and so on (the information may be collected by using a variety of known methods). The connection path information 242 may be regularly updated. The connection path information 242 is used by a process control unit 254 and so on.

The device configuration information 243 is information indicating the configuration of a device such as the corporate DC 4, the edge server 5 and the terminal 6. The device configuration information 243 includes, for example, configuration information indicating the performance of a device and configuration information indicating data reliability. The configuration information indicating the performance of a device is, for example, the number of cores and the number of clocks of a CPU (Central Processing Unit), memory capacity, storage capacity, the presence or absence of a GPU (Graphics Processing Unit), the presence or absence of an accelerator (the presence or absence of an acceleration function other than a general-purpose CPU), and so on. The configuration information indicating data reliability is, for example, the type of storage (HDD (Hard Disk Drive), SDD (Solid State Drive), or the like), whether RAID (Redundant Arrays of Inexpensive Disks) is implemented, the RAID level if RAID is implemented, the presence or absence of mirroring, and so on. Thus, the device configuration information 243 includes static information, which is hard to change in a short term.

The device configuration information 243 is, for example, at the time of registration of a new device such as the corporate DC 4, the edge server 5 and the terminal 6 as a service user, acquired from the device and stored into the storage part 24. The device configuration information 243 is used by, for example, a reliability determination unit 253.

The network configuration information 244 is information indicating the configuration of a network to which the corporate DC4, the edge server 5, the terminal 6 and so on are connected. The network configuration information 244 includes information indicating, for example, whether the network is wired or wireless, a bandwidth, the thickness of the network, the thickness of a backbone, latency, the variation of latency with time, and so on. Thus, the network configuration information 244 includes static information, which is hard to change in a short term.

The network configuration information 244 is, for example, at the time of registration of a new device such as the corporate DC 4, the edge server 5 and the terminal 6 as a service user, acquired by acquisition of necessary information from the device, a relay device (not shown in the drawings) on the way of communication with the device or the like, and stored into the storage part 24. The network configuration information 244 is used by, for example, the reliability determination unit 253.

The device status information 245 is information indicating the status of a device such as the corporate DC 4, the edge server 5 and the terminal 6. The device status information 245 includes information indicating, for example, CPU utilization, available memory, and so on. Thus, unlike the device configuration information 243, the device status information includes dynamic information, which changes with a temporal element, for example.

The device status information 245 is, for example, regularly acquired by a status information acquisition unit 252 and stored into the storage part 24. The device status information 245 may be acquired by the status information acquisition unit 252 at a timing for request for execution of a process. The device status information 245 is used, for example, by the reliability determination unit 253.

The device status information 245 can include information indicating a device status tendency estimated on the basis of the regularly acquired device status information 245. The information indicating a device status tendency is, for example, CPU utilization by time of day (an estimated value) and previously estimated by the status information acquisition unit 252.

The network status information 246 is information indicating the status of the network to which the corporate DC 4, the edge server 5, the terminal 6 and so on are connected. The network status information 246 includes, for example, information indicating the presence or absence of connection of a device, whether the network is in the congestion state, whether there is a failure in the network, and whether Wi-Fi connection is available. Thus, unlike the network configuration information 244, the network status information 246 includes dynamic information, which changes with a temporal element, for example.

The network status information 246 is, for example, regularly acquired by the status information acquisition unit 252 and stored into the storage part 24. The network status information 246 may be acquired by the status information acquisition unit 252 at a timing for request for execution of a process. The network status information 246 is used by, for example, the reliability determination unit 253.

Likewise the device status information 245, the network status information 246 can include information indicating a network status tendency estimated on the basis of the regularly acquired network status information 246. The information indicating the network status tendency is, for example, a connection rate (an estimated value), a congestion and failure occurrence rate (an estimated value) or the like by time of day, and previously estimated by the status information acquisition unit 252.

The device reliability information 247 is, as shown in FIG. 4, information generated by the reliability determination unit 253 on the basis of the device configuration information 243 and the device status information 245. The device reliability information 247 indicates the reliability of a device such as the corporate DC 4, the edge server 5 and the terminal 6.

Device reliability indicated by the device reliability information 247 represents a probability of occurrence of an error in a process result. Device reliability is expressed with the use of a plurality of stages such as values 1 to 100 or ten stages. For example, device reliability is generated by the reliability determination unit 253 so as to become a higher value as device performance and data reliability get higher, for example, CPU performance is high, available storage is present, and RAID is implemented. Moreover, device reliability indicated by the device reliability information 247 is generated by the reliability determination unit 253 so as to become a higher value as the device is more fit to execution of a new process, for example, CPU utilization is low, and available memory is present. Thus, the device reliability information 247 has a value based on the device configuration information 243 and the device status information 245.

In a case where device reliability is generated in the abovementioned manner, it shows that, as a value indicated by device reliability is higher, a probability of occurrence of an error in a process result is lower. Therefore, as will be described later, the process control unit 254 causes a device with higher device reliability to execute a process as a requested SLA is higher.

As shown in FIG. 5, the network reliability information 248 is information generated by the reliability determination unit 253 on the basis of the network configuration information 244 and the network status information 246. The network reliability information 248 indicates the reliability of the network to which the corporate DC 4, the edge server 5, the terminal 6 and so on are connected.

Network reliability indicated by the network reliability information 248 represents an availability of communication with a device such as the corporate DC 4, the edge server 5 and the terminal 6 (whether a requested content reaches the device, whether a process result from the device reaches the system management device 2). The network reliability is expressed with the use of a plurality of stages, for example, values 1 to 100, ten stages, or the like. For example, the network reliability is generated by the reliability determination unit 253 so as to become a higher value as the performance of the network is better, for example, a bandwidth and the network are thick, latency is small, and so on. Moreover, the network reliability is generated by the reliability determination unit 253 so as to become a higher value as the status of the network is better, for example, not LTE (Long Term Evolution) connection but Wi-Fi connection is available, it is not in the congestion state, and there is no failure. Thus, the network reliability information 248 has a value based on the network configuration information 244 and the network status information 246.

In a case where the network reliability is generated in the abovementioned manner, it represents that, as a value indicated by the network reliability is higher, a transmitted content reaches a destination without any trouble. Therefore, as will be described later, the process control unit 254 causes a device with higher network reliability to execute a process as a requested SLA is higher.

The arithmetic processing part 25 has a microprocessor such as an MPU and a peripheral circuit thereof. The arithmetic processing part 25 loads the program 249 from the storage part 24 and executes it, thereby realizing a variety of processing parts by causing the hardware described above and the program 249 to cooperate. Major processing parts realized by the arithmetic processing part 25 are the request control unit 251, the status information acquisition unit 252 (a status information acquisition part), the reliability determination unit 253, the processing control unit 254 (a control part), and a process result adoption unit 255.

The request control unit 251 receives a request including information indicating an SLA from the cloud using terminal 3. Moreover, the request control unit 251 transmits the received information to the process control unit 254.

For example, the request control unit 251 transmits the SLA list information 241 as shown in FIG. 3 to the cloud using terminal 3 via the communication I/F part 21. In the cloud using terminal 3 having received the SLA list information 241, an SLA according to a process to be requested and a fee is selected by the user of the cloud using terminal 3. Then, the cloud using terminal 3 transmits a request including information indicating the SLA to the system management device 2. After that, the request control unit 251 receives the request including the information indicating the SLA from the cloud using terminal 3. Then, the request control unit 251 transmits the received information to the process control unit 254.

For example, by the method as described above, the request control unit 251 receives information indicating an SLA from the cloud using terminal 3.

The request control unit 251 can be configured to, for example, store a received request into the storage part 24 or a storage device (not shown in the drawings) and manage it for a predetermined period (for example, until a response to the request is returned to the cloud using terminal 3). In this case, when a time up to the deadline of a response to the request becomes a predetermined level or less (for example, within one day; may be any level), the request control unit 251 can instruct the process control unit 254 to cause a device such as the corporate DC 4, the edge server 5 and the terminal 6 to execute a process again. In other words, the request control unit 251 can instruct to execute a process again on the basis of information indicating the deadline of a response according to the process. Moreover, the request control unit 251 may be configured to, when requesting to execute a process again, increase the SLA by a predetermined level (for example, in a case where the original LSA requests the terminal 6 with low device reliability and low network reliability, at the time of execution of a process again, change to an SLA requesting a device with higher device reliability and network reliability than the original ones (for example, the edge server 5)). Consequently, it becomes possible to more securely execute a process.

The status information acquisition unit 252 acquires the device status information 245 and the network status information 246, for example, at a predetermined period. Then, the status information acquisition unit 252 stores the acquired device status information 245 and network status information 246 into the storage part 24.

For example, the status information acquisition unit 252 performs communication with a device such as the corporate DC 4, the edge server 5 and the terminal 6, a relay device (not shown in the drawings) on the way of communication with the device or the like and acquires the device status information 245 and the network status information 246. In this exemplary embodiment, a method by which the status information acquisition unit 252 acquires the device status information 245 and the network status information 246 is not specifically limited. The status information acquisition unit 252 can acquire the device status information 245 and the network status information 246 by using a variety of known methods, for example, by using SNMP (Simple Network Management Protocol), ICMP (Internet Control Message Protocol) or the like.

Further, the status information acquisition unit 252 can be configured to estimate information indicating the tendency of a device status and information indicating the tendency of a network status by using the device status information 245 and the network status information 246 stored in the storage part 24. The status information acquisition unit 252 estimates CPU utilization (an estimated value) at certain time and CPU utilization (an estimated value) for each time of day on the basis of CPU utilization for every predetermined time shown by the device status information 245 stored in the storage part 24, for example. Moreover, the status information acquisition unit 252 estimates a congestion and failure occurrence rate (an estimated value) for each time of day on the basis of the presence or absence of congestion and failure for each predetermined time indicated by the network status information 246 stored in the storage part 24, for example. Then, the status information acquisition unit 252 stores the device status information 245 and the network status information 246 including the information indicating the estimated results described above into the storage part 24. The status information acquisition unit 252 may perform estimation other than the illustrated above. The status information acquisition unit 252 can perform a variety of estimations based on the device status information 245 and the network status information 246 stored in the storage part 24.

The reliability determination unit 253 generates the device reliability information 247 indicating device reliability on the basis of the device configuration information 243 and the device status information 245 stored in the storage part 24. The reliability determination unit 253 also generates the network reliability information 248 indicating network reliability on the basis of the network configuration information 244 and the network status information 246 stored in the storage part 24. Then, the reliability determination unit 253 stores the generated device reliability information 247 and the generated network reliability information 248 into the storage part 24. In this exemplary embodiment, a timing that the reliability determination unit 253 generates the device reliability information 247 and the network reliability information 248 is not specifically limited. The reliability determination unit 253 can generate the device reliability information 247 and the network reliability information 248 at any timing.

For example, the reliability determination unit 253 generates device reliability so as to become a higher value as device performance indicated by the device configuration information 243 and data reliability are higher, for example, CPU performance is high, there is available storage, and RAID is implemented. Moreover, the reliability determination unit 253 generates device reliability so as to become a higher value as the status of the device indicated by the device status information 245 is better, for example, CPU utilization is low and there is available memory. Besides, the reliability determination unit 253 can generate device reliability by adding information indicating the tendency of a device status estimated by the status information acquisition unit 252.

In this exemplary embodiment, it is not specifically limited which of the device configuration information 243 and the device status information 245 is valued by the reliability determination unit 253 when device reliability is generated. The reliability determination unit 253 may generate device reliability by adding a value based on the device configuration information 243 and a value based on the device status information 245, or may generate device reliability by multiplying a value based on the device configuration information 243 and a value based on the device status information 245. Furthermore, the reliability determination unit 253 may calculate device reliability after executing predetermined weighting on a value based on the device configuration information 243 and a value based on the device status information 245.

Further, for example, the reliability determination unit 253 generates network reliability so as to be a higher value as the performance of the network indicated by the network configuration information 244 is better, for example, a bandwidth and the network are thick, and latency is small. The reliability determination unit 253 also generates network reliability so as to be a higher value as the status of the network indicated by the network status information 246 is better, for example, not LTE (Long Term Evolution) connection but Wi-Fi connection is available, the network is not in the congestion state, and there is no failure. Furthermore, the reliability determination unit 253 can generate network reliability by adding information indicating the tendency of a network status estimated by the status information acquisition unit 252.

In this exemplary embodiment, it is not specifically limited which of the network configuration information 244 and the network status information 246 is valued by the reliability determination unit 253 when network reliability is generated. The reliability determination unit 253 may generate network reliability by adding a value based on the network configuration information 244 and a value based on the network status information 246, or may generate network reliability by multiplying a value based on the network configuration information 244 and a value based on the network status information 246. Furthermore, the reliability determination unit 253 may calculate network reliability after executing predetermined weighting on a value based on the network configuration information 244 and a value based on the network status information 246.

The process control unit 254 determines a device for executing a process according to a request from the cloud using terminal 3 on the basis of information received from the request control unit 251 (that is, an instruction from the cloud using terminal 3), the device reliability information 247, and the network reliability information 248. Then, the process control unit 254 transmits information indicating a process content, a resource reservation period and a result transmission destination to the determined device. Moreover, the process control unit 254 causes a plurality of processes to execute the same process, for example, in a case where the network reliability or device reliability of the determined device is low.

For example, in a case where a request from the cloud using terminal 3 is not a request for a plurality of related processes, for example, a request for a single process, the process control unit 254 determines a device for executing the process on the basis of an SLA included by the request, the device reliability information 247, and the network reliability information 248. For example, the process control unit 254 calculates a standard of a value of device reliability and a standard of a value of network reliability on the basis of the SLA included by the request. Then, the process control unit 254 determines to cause a device with higher device reliability and network reliability than the standards based on the SLA to execute the process. For example, as shown in FIG. 6, in a case where the SLA included by the request is high enough, the process control unit 254 determines to cause the corporate DC 4 with high device reliability and high network reliability to execute the process. In a case where the SLA included by the request is moderate, the process control unit 254 determines to cause the edge server 5 with moderate device reliability and moderate network reliability to execute the process. In a case where the SLA included by the request is low, the process control unit 254 determines to cause the terminal 6 with low device reliability and low network reliability to execute the process.

Thus, the process control unit 254 determines to cause the following device to execute a process; a device in which both device reliability indicated by the device reliability information 247 and network reliability indicated by the network reliability information 248 are more than standards determined on the basis of an SLA shown by a request. Meanwhile, the storage capacities and CPU performances of the respective corporate DCs 4 are different from each other, and network environments of the corporate DCs 4 are also different from each other. Therefore, the value of device reliability and the value of network reliability vary for each corporate DC 4. Accordingly, a plurality of options included in the SLA list information 241 allows the process control unit 254 to execute more detailed control. To be specific, for example, in a case where a request requires a higher SLA among high SLAs, the process control unit 254 can control, for example, so as to cause a corporate DC 4 with higher device reliability and higher network reliability among the corporate DCs 4 to execute a process. This is true for the edge servers 5 and the terminals 6. Moreover, it is possible that there is an edge server 5 whose device reliability and network reliability are higher than those of a corporate DC 4 with low device reliability and network reliability. Allocating the corporate DC 4 for a high SLA, allocating the edge server 5 for a moderate SLA and allocating a terminal 6 for a low SLA is merely an example, and the process control unit 254 can determine a device for executing a process without being limited to the case illustrated above.

Further, the following case is assumed; as a result of the abovementioned determining, the process control unit 254 determines to cause a device, such as an edge server 5 and a terminal 6, with lower network reliability than a predetermined standard value to execute a process. In this case, it is anticipated that a requested process content does not reach the device such as the edge server 5 and the terminal 6 or a process result transmitted from the device such as the edge server 5 and the terminal 6 does not reach the system management device 2. In the case as described above, the process control unit 254 determines to cause another device (for example, a device with low network reliability likewise) to execute the same process (see FIG. 7). In the determining, as another device for executing the same process, the process control unit 254 selects a device whose network path from the system management device 2 is different from that of the determined device with reference to the connection path information 242. By thus causing devices with different paths to execute the same process, it is possible to reduce a probability that information does not reach any of a plurality of devices for executing the same process.

The number of multiplexing (redundancy) of a process by the process control unit 254 may be set to any number. For example, in the case of causing a device with low network reliability to execute a process, the process control unit 254 may cause one or two other devices to execute the same process at all times. The process control unit 254 may control the number of multiplexing in accordance with the level of network reliability. For example, the process control unit 254 may be configured to cause more devices to execute a process as network reliability is lower.

Further, the following case is assumed; as a result of the abovementioned determining, the process control unit 254 determines to cause a device, such as an edge server 5 and a terminal 6, with lower device reliability than a predetermined standard value to execute a process (the predetermined value may be the same value as or a different value from the value determined for network reliability). In this case, there is a probability that the result of a requested process is wrong, so that the process control unit 254 determines to cause another device (for example, a device with low device reliability likewise) to execute the same process (see FIG. 8). In the determining, it is desirable that, with reference to the connection path information 242, the process control unit 254 selects, as another device for executing the same process, a device whose network path from the system management device 2 serving as a place to store a requested content (data) is as coincident with that of the determined device as possible (for example, a device which passes the same base station or the same relay device, a device which is close in logical position). By thus making at least part of the network paths coincide, the need for transmitting a plurality of duplicated data through different paths is eliminated, so that increase of traffic can be inhibited. In other words, it becomes possible to efficiently use network resources.

The number of multiplexing of a process by the process control unit 254 may be set to any number as in a case where network reliability is low. For example, in the case of causing a device with low device reliability to execute a process, the process control unit 254 may cause one or two other devices to execute the same process at all times. The process control unit 254 may control the number of multiplexing in accordance with the level of device reliability. For example, the process control unit 254 may be configured to cause more devices to execute a process as device reliability is lower.

Further, for example, as shown in FIG. 9, there is a case where a request from the cloud using terminal 3 is a request for a plurality of related processes. With reference to FIG. 9, related processes are, for example, collection/primary processing, feature quantity extraction with the use of the result of the collection/primary processing, deep learning with the use of the result of the feature quantity extraction, and so on. In other words, there is a case where a request from the cloud using terminal 3 is a request for a plurality of related processes including a first process and a second process using the result of the first process.

In a case where a plurality of related processes are thus requested, the process control unit 254 determines a group of devices for executing the processes on the basis of an SLA included by the request, the device reliability information 247, and the network reliability information 248 (see FIG. 10).

For example, in the case of related processes shown in FIG. 9, a device with high arithmetic performance is needed in deep learning. Thus, it is assumed that a relatively high SLA is set. On the other hand, it is assumed that, for collection/primary processing and feature quantity extraction, a low SLA is set. In this case, the process control unit 254 firstly determines, as a device for executing deep learning, an edge server 5 with higher device reliability and network reliability than standards determined on the basis of the relatively high SLA. That is, the process control unit 254 firstly selects from among devices few included by the information processing system 1 (fewer options), for example, a device with high necessary device reliability and network reliability. Subsequently, with reference to the connection path information 242 or the like, the process control unit 254 determines, as a device for executing collection/primary processing and feature quantity extraction, a terminal 6 which is logically or physically close in distance to the selected edge server 5. Otherwise, the process control unit 254 determines a device for executing collection/primary processing and feature quantity extraction in accordance with, for example, a bandwidth which can be reserved between the device and the selected edge server 5. Thus, the process control unit 254 firstly selects a given device and thereafter selects a device with a connection path satisfying a given condition, such as a device located in a short distance from the firstly selected device, thereby determining a group of devices to execute related processes. By thus determining a group of devices, for example, at the time of transmission of a process result from a device for collection/primary processing to a device for feature quantity extraction, a distance for data transmission is short, so that increase of traffic can be inhibited.

Further, in a case where the determined group of devices include a device with lower network reliability than a predetermined standard value, the process control unit 254 determines to cause another group of devices with different network paths to execute the same process. Thus, the process control unit 254 makes a process multiplex on a group-of-devices basis. Consequently, it becomes possible to cause devices to securely execute a process while inhibiting increase of traffic. The process control unit 254 may be configured to multiplex only a process to be executed by a device with low network reliability. A flow of multiplexing a process is the same as in the case described with reference to FIG. 7 and therefore will be omitted. The standard value may be an identical standard value to or a different standard value from that of a case other than the case of related processes.

Further, in a case where the determined group of devices include a device with lower device reliability than a predetermined standard value, the process control unit 254 determines to cause another group of devices (for example, whose network paths are as coincident with each other as possible) to execute the same process. Thus, the process control unit 254 makes a process multiplex on a group-of-devices basis as in the case of low network reliability. The process control unit 254 may be configured to multiplex only a process to be executed by a device with low device reliability. A flow of multiplexing a process is the same as in the case described with reference to FIG. 8, and therefore, will be omitted. The standard value may be an identical standard value to or a different standard value from that of a case other than the case of related processes.

In the case of multiplexing a process, the process control unit 254 designates the system management device 2 as the destination for transmission of a result. On the other hand, in the case of not multiplexing a process, the process control unit 254 may designate the cloud using terminal 3 as the destination for transmission of a result. That is, the process control unit 254 may be configured to transmit a process result not via the system management device 2.

The process result adoption unit 255 receives a process result from a device requested to execute a process. Then, the process result adoption unit 255 transmits the received process result to the cloud using terminal 3 having requested to execute the process. Moreover, the process result adoption unit 255 can be configured to, in a case where the received process result is a process result according to a multiplexed process, execute a process as needed and thereafter transmit a process result.

For example, in a case where the received process result is a process result according to a process which has not been multiplexed, the process result adoption unit 255 transmits the received process result as it is to the cloud using terminal 3. On the other hand, in a case where the received process result is a process result according to a multiplexed process, the process result adoption unit 255 executes a process according to what multiplexing of the process results from. For example, the process result adoption unit 255 executes processes according to the respective cases; a case where a process has been multiplexed because network reliability is low and a case where a process has been executed because device reliability is low.

For example, in a case where a process has been multiplexed due to low network reliability, the process result adoption unit 255 transmits a process result received the earliest to the cloud using terminal 3. On the other hand, in a case where a process has been multiplexed due to low device reliability, the process result adoption unit 255 compares and checks process results from the respective requested devices. Then, the process result adoption unit 255 selects a process result to adopt by majority voting, and transmits the selected process result to the cloud using terminal 3.

Thus, the process result adoption unit 255 executes a process depending on whether a process result is a result executed on a multiplexed process and why a multiplexed process has been executed. Meanwhile, the process result adoption unit 255 may transmit or adopt a process result by a method other than illustrated above. For example, the process result adoption unit 255 may be configured to, in a case where a process has been multiplexed due to low network reliability, after first receiving a process result, wait for a process result from another device for a predetermined period. In this case, the process result adoption unit 255 can be configured to transmit the result of comparison of process results received within a predetermined period to the cloud using terminal 3. The process result adoption unit 255 may be configured to, in a case where a process has been multiplexed due to low device reliability, after first receiving a process result, also wait for a process result from another device for a predetermined period.

The above is an example of the configuration of the system management device 2.

FIG. 2 shows an example of the configuration of the system management device 2 configured by a single information processing device. However, the system management device 2 may be configured by a plurality of information processing devices. In other words, the system management device 2 may be configured by a plurality of information processing devices each having one or more functions; for example, an information processing device having a function as the request control unit 251, and an information processing device having a function as the status information acquisition unit 252.

The cloud using terminal 3 is an information processing device that transmits a request to the system management device 2. The cloud using terminal 3 is, for example, a personal computer, a tablet, a smartphone, or the like. In this exemplary embodiment, the configuration of the cloud using terminal 3 is not specifically limited.

The corporate DC 4 is a data center in an on-premises environment, and has a storage device and an arithmetic device such as a CPU. In general, the device reliability and the network reliability of the corporate DC 4 are relatively higher than those of the edge server 5 and the terminal 6.

The edge server 5 is a server device or the like that is present between the cloud or the system management device 2 and the terminal 6. The edge server 5 may be configured by a single server device, or may be a group of devices configured by a plurality of server devices and executing a process called edge computing. The edge server 5 is also called a fog server. The edge server 5 may be a group of devices that execute fog computing.

The terminal 6 is, for example, a personal computer, a tablet, a smartphone, or the like, owned by an individual. In general, the device reliability and the network reliability of the terminal 6 are relatively lower than those of the corporate DC 4 and the edge server 5. On the other hand, in general, the number of the terminals 6 is more than those of the corporate DCs 4 and the edge servers 5. According to this exemplary embodiment, a process is multiplexed in accordance with device reliability and network reliability, so that it is possible to effectively use excess IT resources of the terminals 6, whose number is many, without affecting the reliability of process execution.

Meanwhile, in this exemplary embodiment, regarding a specific configuration, any of the corporate DC 4, the edge server 5 and the terminal 6 is not limited as well as the cloud using terminal 3.

Next, with reference to FIGS. 11 to 13, an example of a process flow in the system management device 2 will be described. First, with reference to FIG. 11, an example of an overall flow when the system management device 2 requests a process.

With reference to FIG. 11, the request control unit 251 of the system management device 2 receives a request from the cloud using terminal 3 (step S101). Then, the request control unit 251 transmits the received information to the process control unit 254. The request received by the system management device 2 includes information indicating an SLA.

The process control unit 254 of the system management device 2 determines a device for executing a process on the basis of the SLA included by the request, the device reliability information 247, and the network reliability information 248. In a case where the network reliability and the device reliability of the determined device are low, the process control unit 254 causes a plurality of devices to execute the same process. Thus, the process control unit 254 determines a device for executing a process and also determines the process multiplexing number on the basis of the SLA included by the request, the device reliability information 247, and the network reliability information 248 (step S102).

The process control unit 254 transmits necessary information to the determined device (step S103). For example, the process control unit 254 transmits information indicating a process content, a resources reservation period and the destination of transmission of the result. In the case of having determined to multiplex the process, the process control unit 254 transmits necessary information to the respective determined devices.

The above is an example of an overall flow when the system management device 2 requests a process. Next, with reference to FIG. 12, the process at step S102 will be described in more detail.

With reference to FIG. 12, the process control unit 254 checks whether or not a request from the cloud using terminal 3 requires a plurality of related processes (step S201).

In a case where the request does not require a plurality of related processes (step S201, No), the process control unit 254 determines a device for executing a process on the basis of an SLA included by the request, the device reliability information 247 and the network reliability information 248 (step S202). For example, the process control unit 254 calculates a standard of a device reliability value and a standard of a network reliability value on the basis of the SLA included by the request. Then, the process control unit 254 determines to cause a device having higher device reliability and network reliability than the standards based on the SLA to execute the process.

Subsequently, the process control unit 254 checks whether or not the network reliability of the determined device is lower than a predetermined standard value (step S203).

In a case where the network reliability is lower than the standard value (step S203, Yes), the process control unit 254 determines to cause another device (for example, a device with low network reliability likewise) to execute the same process (step S204). In the determining, the process control unit 254, with reference to the connection path information 242, selects a device having a different network path from the system management device 2 as the device for executing the same process. The number of process multiplexing (redundancy) by the process control unit 254 may be set to any number.

On the other hand, in a case where the network reliability is equal to or more than the standard value (step S203, No), the process control unit 254 checks whether or not the device reliability is lower than the standard value (step S205).

In a case where the device reliability is lower than the standard value (step S205, Yes), the process control unit 254 determines to cause another device (for example, a device with low device reliability likewise) to execute the same process (step S206). In the determining, the process control unit 254, with reference to the connection path information 242, selects a device whose network path from the system management device 2 serving as a place for storing a requested content (data) is as coincident as possible (for example, a device passing the same base station or the same relay device, a device which is close in logical position, or the like) as the device for executing the same process. The number of process multiplexing (redundancy) by the process control unit 254 may be set to any number.

On the other hand, in a case where the device reliability is equal to or more than the standard value (step S205, No), the process control unit 254 does not additionally determine a device.

After that, the process control unit 254 transmits necessary information to the determined device (step S103 in FIG. 11).

Further, in a case where the request is a request for a plurality of related processes (step S201, Yes), the process control unit 254 determines a group of devices for executing the processes on the basis of an SLA included by the request, the device reliability information 247, and the network reliability information (step S207). For example, the process control unit 254 first selects from among devices with few number included in the information processing system 1 (devices with fewer options), such as devices whose necessary device reliability and network reliability are high. Subsequently, the process control unit 254, with reference to the connection path information 242 and so on, selects a device satisfying a predetermined condition, such as a device in a short distance from the selected device. For example, through such processing, the process control unit 254 determines a group of devices for executing the process.

Subsequently, the process control unit 254 checks whether or not the determined group of devices include a device whose network reliability is lower than the predetermined standard value (step S208).

In a case where a device whose network reliability is lower than the standard value is included (step S208, Yes), the process control unit 254 determines to cause another group of devices having different network paths to execute the same process (step S209). The number of process multiplexing (redundancy) by the process control unit 254 may be set to any number.

On the other hand, in a case where a device whose network reliability is lower than the standard value is not included (step S208, No), the process control unit 254 checks whether or not the determined group of devices include a device whose device reliability is lower than the predetermined standard value (step S210).

In a case where a device whose device reliability is lower than the standard value is included (step S210, Yes), the process control unit 254 determines to cause another group of devices whose network paths are as identical as possible to execute the same process (step S211). The number of process multiplexing (redundancy) by the process control unit 254 may be set to any number.

On the other hand, in a case where a device whose device reliability is lower than the standard value is not included (step S210, No), the process control unit 254 does not additionally determine a group of devices.

After that, the process control unit 254 transmits necessary information to the respective devices included in the determined group of devices (step S103 in FIG. 11).

The above is an example showing in detail the process at step S102 in FIG. 11. Next, with reference to FIG. 13, an example of a process when the system management device 2 transmits a process result will be described.

With reference to FIG. 13, the process result adoption unit 255 of the system management device 2 receives a process result from a device requested to execute a process (step S301).

The process result adoption unit 255 checks whether or not the received process result is a process result of a multiplexed process (step S302).

In a case where the received process result is not a process result according to a multiplexed process (step S302, No), the process result adoption unit 255 transmits the received process result as it is to the cloud using terminal 3 (step S303). On the other hand, in a case where the received process result is a process result according to a multiplexed process (step S302, Yes), the process result adoption unit 255 executes a process according to a cause of process multiplexing (step S304).

For example, in a case where the process multiplexing has been executed due to low network reliability (step S304, network reliability), the process result adoption unit 255 transmits a process result having been received the earliest to the cloud using terminal 3 (step S305). On the other hand, in a case where the process multiplexing has been executed due to low device reliability (step S304, device reliability), the process result adoption unit 255, for example, compares and checks process results from the respective devices requested to execute the process (step S306). Then, the process result adoption unit 255 selects a process result to adopt by majority voting and transmits the selected process result to the cloud using terminal 3 (step S307).

The above is an example of a process executed when the system management device 2 transmits a process result.

Thus, the system management device 2 in this exemplary embodiment includes the reliability determination unit 253 and the process control unit 254. Such a configuration enables the process control unit 254 of the system management device 2 to determine a device for executing a process on the basis of an SLA included by a request and the device reliability information 247 and the network reliability information 248 generated by the reliability determination unit 253. Moreover, for example, in the case of causing a device with low device reliability and low network reliability to execute a process, the process control unit 254 can cause a plurality of devices to execute the same process. Thus, it becomes possible to, by determining a device for executing a process on the basis of an SLA included by a request and reliability information of the respective resources and also multiplexing a process as necessary, use a variety of excess IT resources while maintaining the reliability of the process. As a result, it becomes possible to properly use available resources when executing a process according to a request, in accordance with the statuses of the resources.

Further, the system management device 2 in this exemplary embodiment is configured to transmit information indicating a destination for transmitting a result to a device for executing a process. With such a configuration, it becomes possible to prevent process results from concentrating on the system management device 2.

In this exemplary embodiment, the process control unit 254 determines a device for executing a process on the basis of the device reliability information 247 based on the device configuration information 243 and the device status information 245, and the network reliability information 248 based on the network configuration information 244 and the network status information 246. However, the process control unit 254 may be configured to determine a device for executing a process with the use of at least only one of the device reliability information 247 and the network reliability information 248. Moreover, the process control unit 254 may be configured to determine a device for executing a process with the use of at least only one of the device configuration information 243 and the network configuration information 244 without generating the device reliability information 247 and the network reliability information 248. In this case, the process control unit 254 determines whether or not to make a process multiplex on the basis of the device configuration information 243 and the network configuration information 244. Moreover, the process control unit 254 may be configured to determine a device for executing a process with the use of at least only one of the device status information 245 and the network status information 246. In this case, the process control unit 254 determines whether or not to make a process multiplex on the basis of the device status information 245 and the network status information 246.

Further, the device configuration information 243, the network configuration information 244, the device status information 245 and the network status information 246 illustrated in this exemplary embodiment are merely examples. The device configuration information 243, the network configuration information 244, the device status information 245 and the network status information 246 may include only part of the information illustrated in this exemplary embodiment, or may include information other than illustrated in this exemplary embodiment.

Further, the terminals 6 may include a tablet, a smartphone or the like of an individual, so that it can be assumed that the terminal 6 is moving. Therefore, the status information acquisition unit 252 may be configured to, for example, detect the movement status of the terminal 6 (for example, detect change of a communicating base station). Moreover, it can be assumed that a network status or the like largely varies with movement of the terminal 6. Therefore, the process control unit 254 may be configured to exclude the moving terminal 6 (or the terminal 6 moving at a given speed or more, which can be found by detecting the movement speed of the terminal 6) from candidates of a device to be determined. The reliability determination unit 253 may be configured to generate the network reliability information 248 in consideration of information indicating the movement status of the device.

Second Exemplary Embodiment

Next, with reference to FIGS. 14 and 15, a second exemplary embodiment of the present invention will be described. In the second exemplary embodiment, the configurations of a system management device 7 and a system management device 8 will be outlined.

Figure 14:
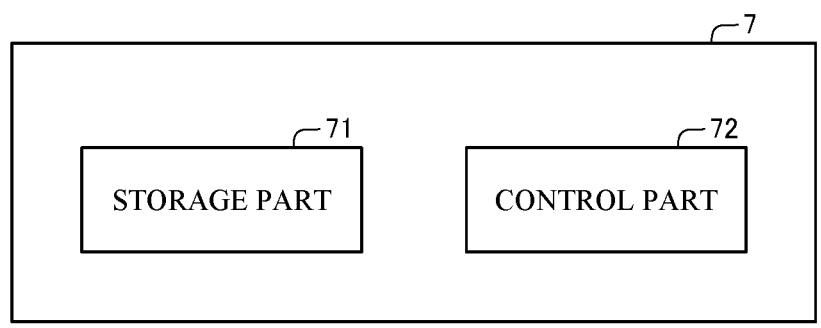
FIG. 14 is a block diagram showing an example of a configuration of a system management device according to a second exemplary embodiment of the present invention.

With reference to FIG. 14, the system management device 7 has a storage part 71 and a control part 72. For example, the system management device 7 has a storage device and an arithmetic device, which are not shown in the drawings, and realizes the control part 72 by execution of a program stored in the storage device (not shown in the drawings) by the arithmetic device (not shown in the drawings).

The storage part 71 is a storage device such as a memory and a hard disk. In the storage part 71, at least one of the configuration of a device and the configuration of a network to which a device belongs is stored.

The control part 72, on the basis of an instruction from a client and at least one of the device configuration and the network configuration stored in the storage part 71, determines a device for executing a process according to the instruction from the client from among a plurality of devices belonging to a system.

Thus, the system management device 7 has the storage part 71 for storing at least one of the configuration of a device and the configuration of a network to which a device belongs and the control part 72. Such a configuration allows the control part 72 to, on the basis of an instruction from a client and at least one of the device configuration and the network configuration stored in the storage part 71, determine a device for executing a process corresponding to the instruction from the client from among a plurality of devices belonging to a system. As a result, it becomes possible to properly select a device for executing a process according to a request.

Further, the abovementioned system management device 7 can be realized by installation of a predetermined program into the system management device 7. To be specific, a program as another aspect of the present invention is a program for causing an information processing device having the storage part 71 for storing at least one of the configuration of a device and the configuration of a network to which a device belongs to realize a control unit (the control part 72) that determines a device for executing a process according to the instruction of the client from among a plurality of devices belonging to a system.

Further, a system management method executed by the abovementioned system management device 7 is a system management method executed by the system management device 7. The method includes: acquiring at least one of the configuration of a device and the configuration of a network to which a device belongs; and determining, on the basis of an instruction from a client and at least one of the device configuration and the network configuration of the network having been acquired, a device for executing a process according to the instruction from the client from among a plurality of devices belonging to a system.

Further, an information processing system as another aspect of the present invention is an information processing system which includes the system management device 7 and a device executing a process on the basis of an instruction of the system management device 7. The system management device 7 includes: the storage part 71 for storing at least one of the configuration of a device and the configuration of a network to which the device belongs; and the control part 72 that determines, on the basis of an instruction from a client and at least one of the device configuration and the network configuration, a device for executing a process according to the instruction from the client from among a plurality of devices belonging to a system.

The invention of the program, the system management method or the information processing system configured as described above has the same action as the system management device 7, and therefore, can achieve the object of the present invention stated above.

Figure 15:
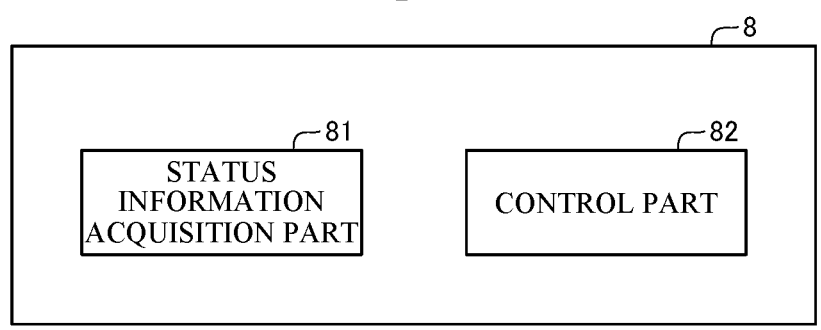
FIG. 15 is a block diagram showing an example of another configuration of the system management device according to the second exemplary embodiment of the present invention.

Further, with reference to FIG. 15, the system management device 8 has a status information acquisition part 81 and a control part 82. For example, the system management device 8 has a storage device and an arithmetic device, which are not shown in the drawings, and realizes the control part 82 by execution of a program stored in the storage device (not shown in the drawings) by the arithmetic device (not shown in the drawings).

The status information acquisition part 81 acquires at least one of device status information indicating the status of a device and network status information indicating the status of a network to which a device belongs.

The control part 82 determines, on the basis of an instruction from a client and at least one of the device status information and the network status information acquired by the status information acquisition part 81, whether to cause a plurality of devices to execute the same process.

Thus, the system management device 8 has the status information acquisition part 81 and the control part 82. Such a configuration allows the control part 82 to determine, on the basis of at least one of the device status information and the network status information acquired by the status information acquisition part 81, whether to cause a plurality of devices to execute the same process. Accordingly, it becomes possible to properly select a device for executing a process according to a request.

<Supplementary Notes>

The whole or part of the exemplary embodiments disclosed above can be described as the following supplementary notes. Below, the outline of the system management device and so on according to the present invention will be described. However, the present invention is not limited to the following configuration.

(Supplementary Note 1)

A system management device, comprising:

a storage part for storing at least one of a device configuration of a device and a network configuration of a network to which the device belongs; and a control part configured to, from among a plurality of devices belonging to a system, determine the device for executing a process on a basis of at least one of the device configuration and the network configuration.

(Supplementary Note 2)

The system management device according to Supplementary Note 1, wherein the control part is configured to, on a basis of at least one of the device configuration of the determined device for executing the process and the network configuration of the network to which the device belongs, determine whether or not to cause another device to execute the process.

(Supplementary Note 3)

The system management device according to Supplementary Note 1 or 2, wherein the control part is configured to, on a basis of at least one of device reliability based on the device configuration of the determined device for executing the process and network reliability based on the network configuration of the network to which the device belongs, determine whether or not to cause another device to execute the process.

(Supplementary Note 4)

The system management device according to any of Supplementary Notes 1 to 3, wherein the control part is configured to, when causing the device whose reliability based on the network configuration is lower than a predetermined standard to execute the process, cause another device whose network path is different from that of the device to execute the same process.

(Supplementary Note 5)

The system management device according to any of Supplementary Notes 1 to 4, wherein the control part is configured to, when causing the device whose reliability based on the device configuration is lower than a predetermined standard to execute the process, on a basis of a network path to the device, determine another device for executing the same process.

(Supplementary Note 6)

The system management device according to any of Supplementary Notes 1 to 5, comprising a status information acquisition part configured to acquire at least one of device status information indicating a status of the device and network status information indicating a status of a network to which the device belongs, wherein the control part is configured to determine the device for executing the process on a basis of information stored in the storage part and information acquired by the status information acquisition part.

(Supplementary Note 7)

The system management device according to Supplementary Note 6, wherein:

the status information acquisition part is configured to store the acquired device status information and the acquired network status information into the storage part and on a basis of the information stored in the storage part, estimate a tendency of at least one of the device status information and the network status information.; and the control part is configured to determine the device for executing the process on a basis of a result of estimation by the status information acquisition part.

(Supplementary Note 8)

The system management device according to any of Supplementary Notes 1 to 7, wherein the control part is configured to, on a basis of information included by an instruction from a client requesting execution of the process, after once determining the device for executing the process, determine to cause another device to execute the same process.

(Supplementary Note 9)

The system management device according to Supplementary Note 8, wherein:

the instruction from the client includes information indicating a due date for a response according to the process; and the control part is configured to determine to, when a time up to the due date becomes a predetermined time, cause the device whose device reliability based on the device configuration or network reliability based on the network configuration of the network to which the device belongs is higher than that of the determined device for executing the process to execute the same process.

(Supplementary Note 10)

A system management method executed by a system management device, the method comprising:

acquiring at least one of a device configuration of a device and a network configuration of a network to which the device belongs; and from among a plurality of devices belonging to a system, determining the device for executing a process on a basis of at least one of the acquired device configuration and the acquired network configuration.

(Supplementary Note 11)

The system management method according to Supplementary Note 10, comprising, on a basis of at least one of the device configuration of the determined device for executing the process and the network configuration of the network to which the device belongs, determining whether or not to cause another device to execute the process.

(Supplementary Note 12)

The system management method according to Supplementary Note 10, comprising, on a basis of at least one of device reliability based on the device configuration of the determined device for executing the process and network reliability based on the network configuration of the network to which the device belongs, determining whether or not to cause another device to execute the process.

(Supplementary Note 13)

The system management method according to Supplementary Note 10, comprising, when causing the device whose reliability based on the network configuration is lower than a predetermined standard to execute the process, causing another device whose network path is different from that of the device to execute the same process.

(Supplementary Note 14)

The system management method according to Supplementary Note 10, comprising, when causing the device whose reliability based on the device configuration is lower than a predetermined standard to execute the process, on a basis of a network path to the device, determining another device for executing the same process.

(Supplementary Note 15)

The system management method according to Supplementary Note 10, comprising:

acquiring at least one of device status information indicating a status of the device and network status information indicating a status of a network to which the device belongs; and determining the device for executing the process on a basis of information stored in a storage part and the acquired information.

(Supplementary Note 16)

A non-transitory computer-readable medium storing a computer program comprising instructions for causing an information processing device to realize a control unit, the information processing device including a storage part configured to store at least one of a device configuration of a device and a network configuration of a network to which the device belongs, the control unit being configured to, from among a plurality of devices belonging to a system, determine the device for executing a process on a basis of at least one of the acquired device configuration and the acquired network configuration.

(Supplementary Note 17)

The non-transitory computer-readable medium storing the computer program according to Supplementary Note 16, wherein the control unit is configured to, on a basis of at least one of the device configuration of the determined device for executing the process and the network configuration of the network to which the device belongs, determine whether or not to cause another device to execute the process.

(Supplementary Note 18)

The non-transitory computer-readable medium storing the computer program according to Supplementary Note 16, wherein the control unit is configured to, on a basis of at least one of device reliability based on the device configuration of the determined device for executing the process and network reliability based on the network configuration of the network to which the device belongs, determine whether or not to cause another device to execute the process.

(Supplementary Note 19)

The non-transitory computer-readable medium storing the computer program according to Supplementary Note 16, wherein the control unit is configured to, when causing the device whose reliability based on the network configuration is lower than a predetermined standard to execute the process, cause another device whose network path is different from that of the device to execute the same process.

(Supplementary Note 20)

The non-transitory computer-readable medium storing the computer program according to Supplementary Note 16, wherein the control unit is configured to, when causing the device whose reliability based on the device configuration is lower than a predetermined standard to execute the process, on a basis of a network path to the device, determine another device for executing the same process.

(Supplementary Note 21)

An information processing system comprising:
a system management device including: a storage part for storing at least one of a device configuration of a device and a network configuration of a network to which the device belongs; and a control part configured to, from among a plurality of devices belonging to a system, determine the device for executing a process on a basis of at least one of the device configuration and the network configuration; and
the device configured to execute the process on a basis of an instruction from the system management device.

(Supplementary Note 22)

A system management device comprising:
a status information acquisition part configured to acquire at least one of device status information indicating a status of a device and network status information indicating a status of a network to which the device belongs; and
a control part configured to, on a basis of at least one of the device status information and the network status information, determine whether or not to cause a plurality of devices to execute the same process.

The program disclosed in the exemplary embodiments and supplementary notes is stored in a storage device or recorded on a computer-readable recording medium. For example, the recording medium is a portable medium such as a flexible disk, an optical disk, a magneto-optical disk, and a semiconductor memory.

Although the present invention has been described above with reference to the exemplary embodiments, the present invention is not limited to the exemplary embodiments described above. The configurations and details of the present invention can be changed in various manners that can be understood by one skilled in the art within the scope of the present invention.

DESCRIPTION OF REFERENCE NUMERALS 1 information processing system
2 system management device
21 communication I/F part
22 operation input part
23 screen display part
24 storage part
241 SLA list information
242 connection path information
243 device configuration information
244 network configuration information
245 device status information
246 network status information
247 device reliability information
248 network reliability information
249 program
25 arithmetic processing part
251 request control unit
252 status information acquisition unit
253 reliability determination unit
254 process control unit
255 process result adoption unit
3 cloud using terminal
4 corporate DC
5 edge server
6 terminal
7 system management device
71 storage part
72 control part
8 system management device
81 status information acquisition part
82 control part

The invention claimed is:

1. A system management device, comprising:
a processor; and
a memory storing instructions executable by the processor to:
store at least one of a device configuration of a device and a network configuration of a network to which the device belongs;
from among a plurality of devices belonging to a system, determine the device for executing a process based on the at least one of the device configuration and the network configuration; and
receive a first process result from the device requested to execute the process, wherein
the processor is to select the device to be caused to execute a process according to a received request and, based on device reliability corresponding to device performance based on the device configuration of the selected device and indicative of a probability of an occurrence of an error in the selected device and network reliability corresponding to network performance based on the network configuration of the network to which the selected device belongs and indicative of a probability of an occurrence of an error in the network, determine whether to cause another device to execute another process that is a same process as the process to be executed by the selected device, and determine a different device between a case in which the device reliability has a problem and a case in which the network reliability has the problem,
the processor is to, when causing the device having the network reliability corresponding to the network performance that is lower than a predetermined standard to execute the process, cause the another device having a network path different than a network path of the device to execute the another process,
the processor is to, when causing the device having the device reliability corresponding to the device performance that is lower than the predetermined standard to execute the process, based on the network path to the device, determine the another device for executing the another process such that at least part of the network path of the device and at least part of the network path of the another device coincide with each other,
the processor is to, when the first process result is according to a multiplexed process, determine whether to select a process result to be adopted after waiting for a second process result or without waiting for the second process result, depending on whether execution of the multiplexed process results from the network reliability or the device reliability, and select the process result to be adopted according to a result of determining whether to select the process result to be adopted after waiting for the second process result or without waiting for the another second process result, the processor is to, when the execution of the multiplexed process results from low network reliability, select the process result to be adopted as the first process result without waiting for the second process result, the processor is to, when the execution of the multiplexed process results from low device reliability, wait for the second process result and compare and check the first process result and the second process result, and select the process result to be adopted as the first process result or the second process result according to a comparison result, the processor is to, based on information included by an instruction from a client requesting execution of the process, after once determining the device for executing the process, determine to cause the another device to execute the same process, the instruction from the client includes information indicating a due date for a response according to the process, and the processor is to determine to, when a time up to the due date becomes a predetermined time, cause the another device having device reliability higher than the device reliability of the device or network reliability higher than the network reliability of the device to execute the same process.

2. The system management device according to claim 1, wherein the instructions are executable by the processor to further acquire at least one of device status information indicating a status of the device and network status information indicating a status of the network to which the device belongs, wherein the processor is to determine the device for executing the process based on the at least one of the device configuration and the network configuration and the at least one of the device status information and the network status information.

3. The system management device according to claim 2, wherein:

the processor is to store the acquired device status information and the acquired network status information, and estimate a tendency of the at least one of the device status information and the network status information; and the processor is to determine the device for executing the process further based on the tendency as estimated.

4. A system management method executed by a system management device, the method comprising:

acquiring at least one of a device configuration of a device and a network configuration of a network to which the device belongs;

from among a plurality of devices belonging to a system, determining the device for executing a process on a basis of at least one of the acquired device configuration and the acquired network configuration;

receiving a first process result from the device requested to execute the process; selecting the device to be caused to execute a process according to a received request and, based on device reliability corresponding to device performance based on the device configuration of the selected device and indicative of a probability of an occurrence of an error in the selected device and network reliability corresponding to network performance based on the network configuration of the network to which the selected device belongs and indicative of a probability of an occurrence of an error in the network, determining whether to cause another device to execute another process that is a same process as the process to be executed by the selected device, and determing a different device between a case in which the device reliability has a problem and a case in which the network reliability has the problem, when causing the device having the network reliability corresponding to the network performance that is lower than a predetermined standard to execute the process, causing the another device having a network path different than a network path of the device to execute the another process, when causing the device having the device reliability corresponding to the device performance that is lower than the predetermined standard to execute the process, based on the network path to the device, determining the another device for executing the another process such that at least part of the network path of the device and at least part of the network path of the another device coincide with each other, when the first process result is according to a multiplexed process, determining whether to select a process result to be adopted after waiting for a second process result or without waiting for the second process result, depending on whether execution of the multiplexed process results from the network reliability or the device reliability, and selecting the process result to be adopted according to a result of determining whether to select the process result to be adopted after waiting for the second process result or without waiting for the second process result, when the execution of the multiplexed process results from low network reliability, selecting the process result to be adopted as the first process result without waiting for the second process result, when the execution of the multiplexed process results from low device reliability, waiting for the second process result and comparing and checking the first process result and the second process result, and selecting the process result to be adopted as the first process result or the second process result according to a comparison result, based on information included by an instruction from a client requesting execution of the process, after once determining the device for executing the process, determining to cause the another device to execute the same process, the instruction from the client includes information indicating a due date for a response according to the process, and determining to, when a time up to the due date becomes a predetermined time, cause the another device having device reliability higher than the device reliability of the device or network reliability higher than the network reliability of the device to execute the same process.

5. The system management method according to claim 4, further acquiring at least one of device status information indicating a status of the device and network status information indicating a status of the network to which the device belongs; and determining the device for executing the process based on the at least one of the device configuration and the network configuration and the at least one of the device status information and the network status information.

6. A non-transitory computer-readable medium storing a computer program comprising instructions for causing an information processing device to perform processing comprising:

acquiring at least one of a device configuration of a device and a network configuration of a network to which the device belongs;

from among a plurality of devices belonging to a system, determining the device for executing a process on a basis of at least one of the acquired device configuration and the acquired network configuration;

receiving a first process result from the device requested to execute the process; selecting the device to be caused to execute a process according to a received request and, based on device reliability corresponding to device performance based on the device configuration of the selected device and indicative of a probability of an occurrence of an error in the selected device and network reliability corresponding to network performance based on the network configuration of the network to which the selected device belongs and indicative of a probability of an occurrence of an error in the network, determining whether to cause another device to execute another process that is a same process as the process to be executed by the selected device, and determining a different device between a case in which the device reliability has a problem and a case in which the network reliability has the problem, when causing the device having the network reliability corresponding to the network performance that is lower than a predetermined standard to execute the process, causing the another device having a network path different than a network path of the device to execute the another process, when causing the device having the device reliability corresponding to the device performance that is lower than the predetermined standard to execute the process, based on the network path to the device, determining the another device for executing the another process such that at least part of the network path of the device and at least part of the network path of the another device coincide with each other, when the first process result is according to a multiplexed process, determining whether to select a process result to be adopted after waiting for a second process result or without waiting for the second process result, depending on whether execution of the multiplexed process results from the network reliability or the device reliability, and selecting the process result to be adopted according to a result of determining whether to select the process result to be adopted after waiting for the second process result or without waiting for the second process result, and when the execution of the multiplexed process results from low network reliability, selecting the process result to be adopted as the first process result without waiting for the second process result, when the execution of the multiplexed process results from low device reliability, waiting for the second process result and comparing and checking the first process result and the second process result, and selecting the process result to be adopted as the first process result or the second process result according to a comparison result, based on information included by an instruction from a client requesting execution of the process, after once determining the device for executing the process, determining to cause the another device to execute the same process, the instruction from the client includes information indicating a due date for a response according to the process, and determining to, when a time up to the due date becomes a predetermined time, cause the another device having device reliability higher than the device reliability of the device or network reliability higher than the network reliability of the device to execute the same process.

7. The non-transitory computer-readable medium according to claim 6, the processing further comprising:

acquiring at least one of device status information indicating a status of the device and network status information indicating a status of the network to which the device belongs; and determining the device for executing the process based on the at least one of the device configuration and the network configuration and the at least one of the device status information and the network status information.

* * * * *